United States Patent [19]
Pauwels et al.

[11] Patent Number: 5,506,840
[45] Date of Patent: Apr. 9, 1996

[54] ASYNCHRONOUS SWITCHING NODE AND ROUTING LOGIC MEANS FOR A SWITCHING ELEMENT USED THEREIN

[75] Inventors: Bart J. G. Pauwels, Borgerhout; Michel A. R. Henrion, Brussels, both of Belgium

[73] Assignee: Alcatel N.V., Amsterdam, Netherlands

[21] Appl. No.: 156,021

[22] Filed: Nov. 19, 1993

[30] Foreign Application Priority Data

Dec. 18, 1992 [EP] European Pat. Off. .............. 92204012
Mar. 31, 1993 [FR] France .................... 93 03764

[51] Int. Cl.$^6$ ..................................... H04Q 11/04
[52] U.S. Cl. .............. 370/60.1; 370/54; 370/60; 370/94.1
[58] Field of Search .......... 370/60.1, 60, 94.1, 370/54, 94.3, 58.1, 58.2, 58.3

[56] References Cited

U.S. PATENT DOCUMENTS

| | | | |
|---|---|---|---|
| 4,939,718 | 7/1990 | Servel et al. ............ | 370/60.1 |
| 5,097,466 | 3/1992 | Kammerl ................. | 370/60 |
| 5,164,938 | 11/1992 | Jurkevich et al. ......... | 370/60.1 |
| 5,214,639 | 5/1993 | Herion .................... | 370/60 |
| 5,309,430 | 5/1994 | Verhille et al. ........... | 370/60 |

FOREIGN PATENT DOCUMENTS

| | | |
|---|---|---|
| 0446493 | 9/1991 | European Pat. Off. . |
| 0524350 | 1/1993 | European Pat. Off. . |
| 9102420 | 2/1991 | WIPO . |

*Primary Examiner*—Douglas W. Olms
*Assistant Examiner*—Shick Hom
*Attorney, Agent, or Firm*—Ware, Fressola, Van Der Sluys & Adolphson

[57] ABSTRACT

An asynchronous switching node is described for distributing cells from an input port (I1, ..., IN) of a node (ND) to a group of output ports (LG1, ..., Lgk) thereof. The asynchronous switching node includes switching stages (S1, S2, S3) each having a switching element (S11, ..., S3N) with inlets (IP1–IPN) and outlets (OP1–OPN). Each switching element (S11, ..., S3N) has a routing logic circuit (MC1; MC2; RL) for routing one of the cells from one of the inlets (IP1–IPN) of one of the switching element (S11, ..., S3N) to one of the outlets (OP1–OPN) thereof based on an internal routing label (LGA; SRT) associated with a cell. The switching element (S11, ..., S3N) uses the internal routing label (LGA; SRT) to identify at least one distribution tree having branches (BR1, ..., BR6) which connect the input port (I1, ..., IN) with the group of output ports (LG1, ..., Lgk). The routing logic circuit (MC1; MC2; RL) has a preselection circuit (MB; M; RM) for preselecting under the control of the internal routing label (LGA; SRT) a set of the branches (BR1, ..., BR6), has a selection circuit (MX; MX'; SEL) for dynamically selecting one of the branches (BR1, ..., BR6) and has an identifier circuit for identifying a route on a selected outgoing branch (BR1, ..., BR6) from the one switching element (S11, ..., S3N).

14 Claims, 12 Drawing Sheets

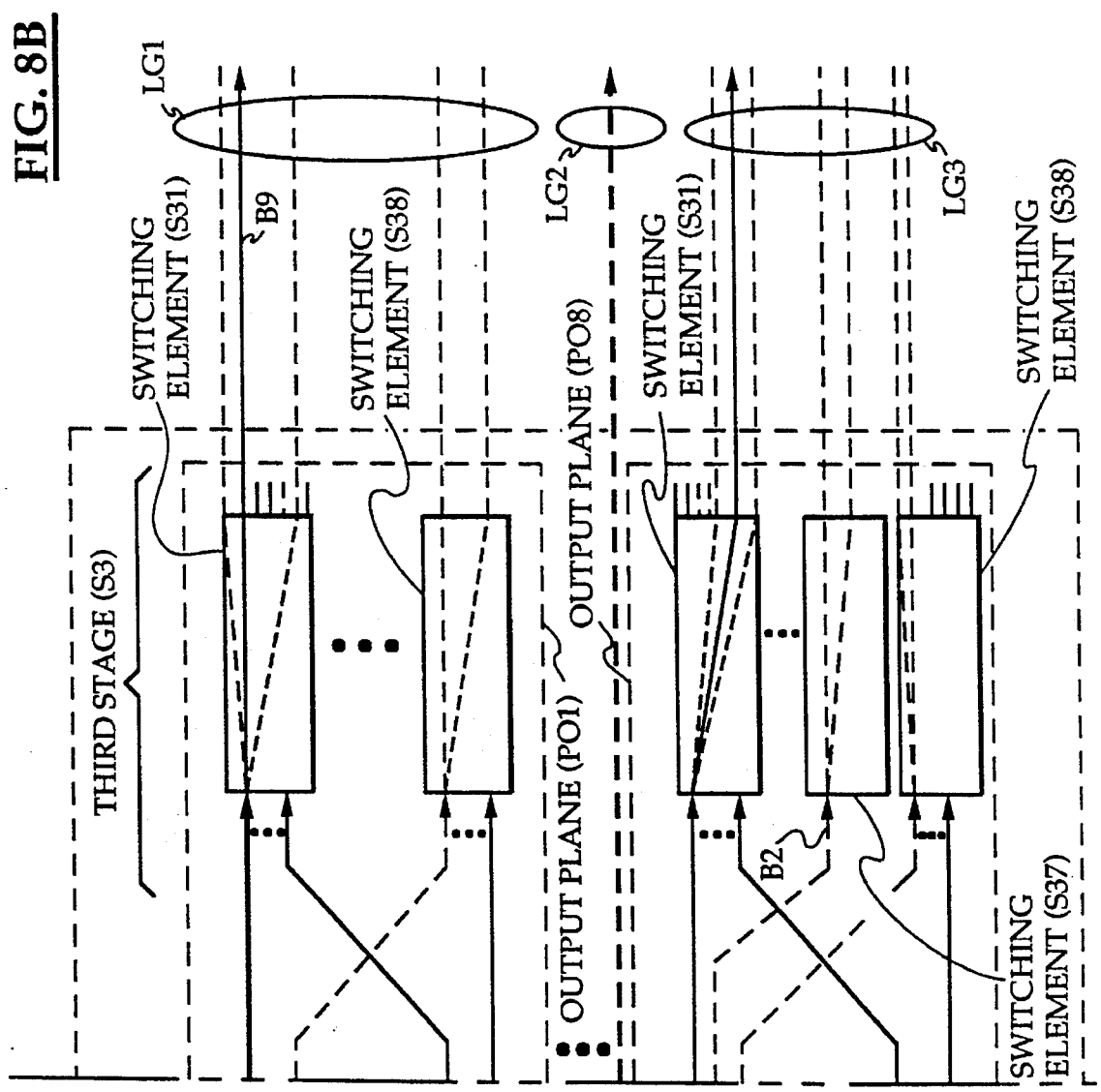

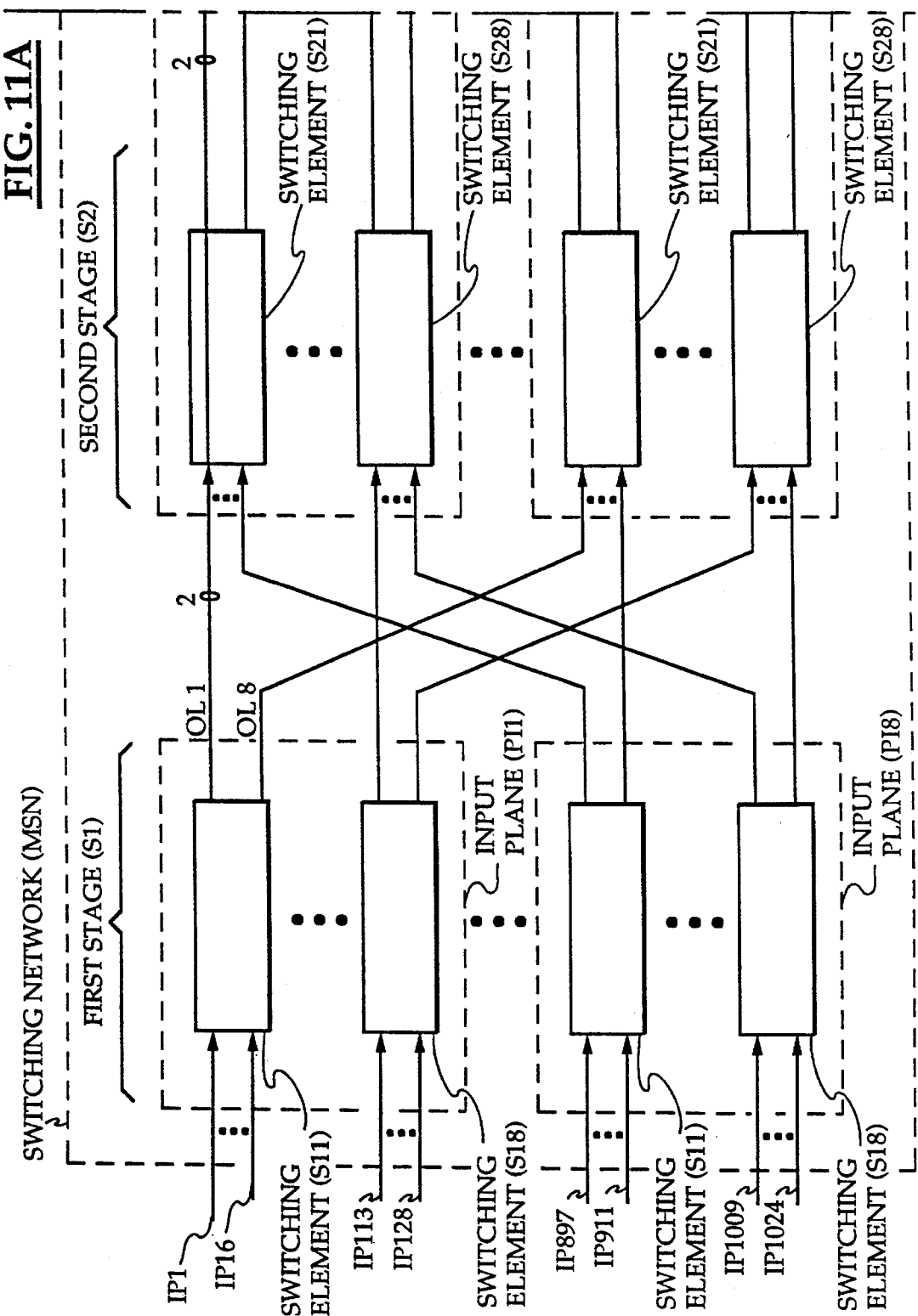

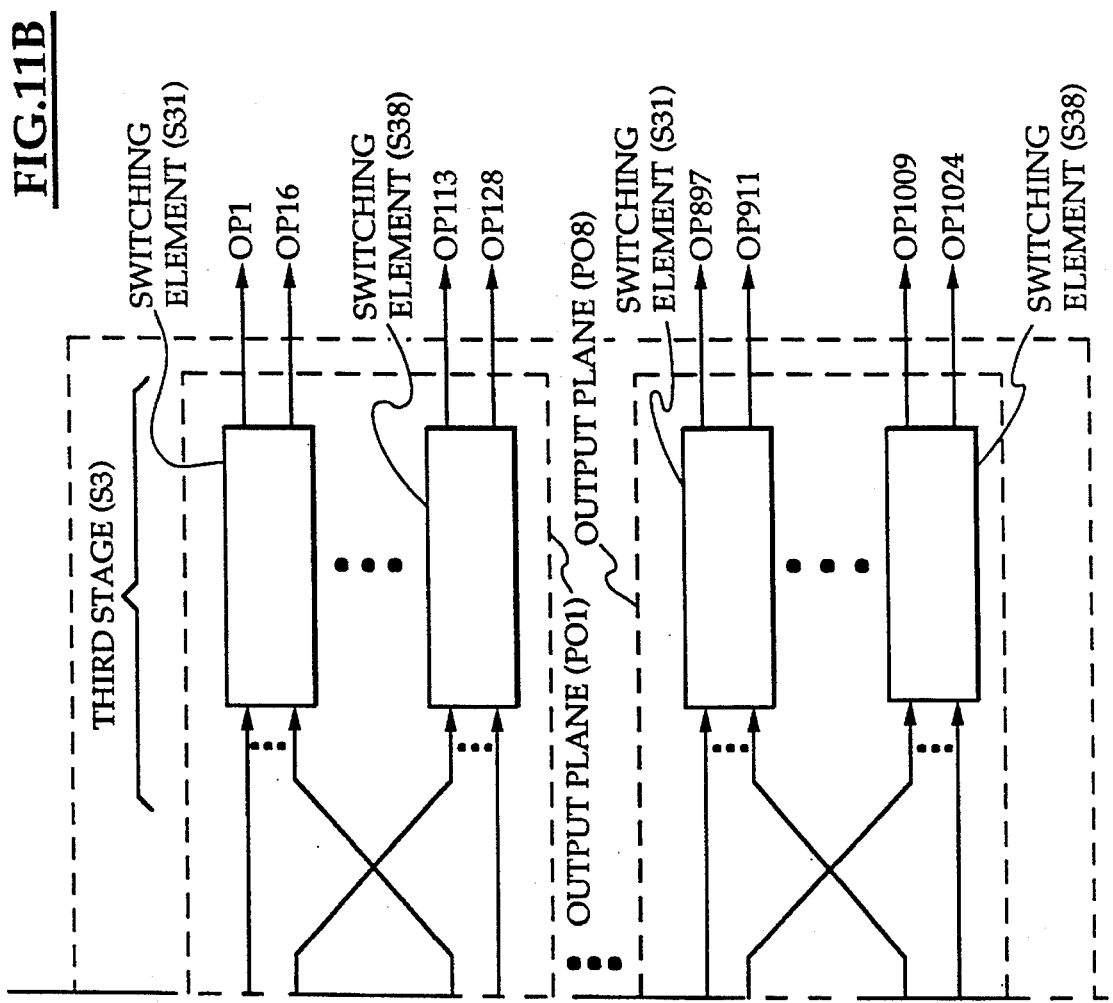

ASYNCHRONOUS SWITCHING NODE AND ROUTING LOGIC MEANS FOR A SWITCHING ELEMENT USED THEREIN

TECHNICAL FIELD

The invention relates to communications and more particularly to an asynchronous switching node.

BACKGROUND OF THE INVENTION

Such a switching node was disclosed in the European patent application 0524350 published on Jan. 27, 1993 and corresponding to U.S. Pat. No. 5,309,430, wherein it was proposed to transfer cells to a further node by regularly distributing them over various transmission links connecting the output ports of the group to the further node. In so doing enhanced efficiency of the links between the nodes as well as enhanced reliability of communications on these links is provided.

A problem with this approach is that it does not allow the addressing of groups comprising arbitrarily chosen output ports, but only the addressing of so called regular groups, i.e. groups comprising output ports whose adresses are linked by a mathematical relationship. The addresses of the output ports constituting a regular group thus are for instance of the form ABXDEFXXIJXX where A, B, D, E, G, I and J are specific binary values and X is a symbol representing any binary value, i.e. it is a don't care value.

The above limitation to regular groups arises from the fact that such a node achieves the distribution over such a regular group of output ports by addressing the group with an address as in the above example, i.e. defined with the aid of don't care values, and by letting each switching element finally associate a specific value to these don't care values at the moment it switches a cell. It can thus be easily verified that the above described switching node cannot distribute cells to an irregular group of output ports since such an irregular group rules out the use of random or don't care bit values to identify outlets of a switching element.

DISCLOSURE OF INVENTION

An object of the invention is therefore to provide a switching node of the above type but which is capable of distributing cells also to groups of output ports which are irregular.

This object is achieved thanks to the fact that said internal routing label identifies at least one distribution tree the branches of which connect said input port with said group of output ports and that at least one of said routing logic means includes a preselection means preselecting under the control of said internal routing label a set of said branches which is connected to the switching element of which said routing logic means forms part, a selection means for dynamically selecting one of the preselected branches of said set and means identifying a route on the thus selected branch outgoing from said switching element.

The above node can distribute cells to any group of output ports since for any such group a distribution tree may be defined that connects the input port to each of the output ports constituting the group.

Indeed, for any group of output ports the following method may be used in order to address it. Starting from each output port included in the group a path is traced back which cells have to follow in order to reach such an output port. In this way the branches, composed of all routes leading from the input port to one of the output ports of the group, are determined and these branches clearly form together the above distribution tree associated to this group.

For the routing of cells via this distribution tree, it is first of all clear that these branches diverge in some of the switching elements such that a branchpoint has to be provided in these switching elements in order to address the group. These branchpoints are reflected in the definition of the sets of branches or routes in this switching element and it is thus clear that in dynamically selecting a branch out of the set of preselected branches the cells which are so routed are distributed over the output ports of the group.

It is to be noted that whereas the above-described switching node is of a specific type, i.e. the multipath self-routing type, the present invention is applicable to any type of node as will become apparent from the following discussion.

A first type of switching node is the single-path type wherein the path followed by a cell received on a given input port and addressed to a particular output port is entirely decided as soon as the connection is made. When it receives a cell, each switching element identifies a single one of its outlets providing access to the node output port to which the cell is addressed.

A second switching node type performs multipath routing according to which the path followed by a cell addressed to a particular output port is not entirely decided at the moment it is applied to the node but is decided step by step in each stage, with multiple possible paths for crossing stages other than the first and the last. When a switching element now receives a cell, it identifies a group of its outlets providing access to a node output port to which the cell is addressed. Such an outlet group is called a routing group for this output port. After the identification of such a routing group the further step of selecting one of the outlets comprised in this group is performed by the switching element e.g. randomly.

From the above it can be seen that the expression outgoing "route" of a switching element used in defining the present switching node refers to:
- a routing group if the network in question is of the multipath routing type, or
- a single outlet if the network is of the single-path routing type.

A further distinction with respect to the switching node types may be drawn between the distinct routing types: i.e. translation routing and self-routing. In a conventional switching node a cell addressed to a single node output port is routed in each switching element towards a single outgoing route of that switching element. With translation routing the route is selected by translating a connection identifier that is contained in the cell header whereas with self-routing the route is selected directly by analysing internal routing data added to the cell and derived from the former identifier.

From the latter it can be seen that the expression "internal routing label" used to define the present switching node refers either to this identifier or to this routing data added to the cell.

The present invention further relates to a routing logic means for a switching element having at least one inlet and a plurality of outgoing routes each comprising at least one outlet, said routing logic means selecting for the cells received at said inlet at least one said route based on an internal routing label associated to said cells and routing said cells to a said outlet of said selected route.

Such a routing logic means is well known in the art from the European patent application EP-A1-0446493 corresponding to U.S. Ser. No. 07/668,582. It allows to provide a switching node of the above discussed multipath type since it may route the cells to one outlet of a specific routing group, as discussed above. This routing logic means is used in the above described asynchronous switching node as can be verified from the first mentioned patent application and cannot, as discussed in detail hereafter, provide for the distribution of cells to irregular groups of output ports.

Indeed, this known routing logic means is not able to route cells otherwise than either to any of its outlets, via a full distribution, or to any of those outlets only that are bundled in a routing group and in so doing may only serve to transfer cells to the above mentioned regular groups.

Consider for example a cell to be transferred from a node input port to any output port within a group of eight node output ports with addresses given by the mathematical relationship $1792+k*32$ in which $k=1, \ldots, 8$. The destination binary address of this group of output ports associated with the cell then comprises three bit fields: 11, XXX and 11111. These bit fields constitute in the above described node the internal routing label used in succession by the switching elements of a three-stage switching network. Due to the interconnection of the switching elements within the switching network and the corresponding choice for the routing groups the cell may arrive at any one of the output ports of the last mentioned group only thanks to the full distribution performed in the second stage corresponding to the bit field "XXX".

Hence, it can be seen that the addressing of groups of output ports may only be performed with the above described routing logic means through the use of a full distribution, whereas the routing groups may only be used to a very limited extent for the same purpose. Indeed, the routing groups are initialized to suit the requirements of the node and more particularly of its interconnection and therefore are used to route any cell handled by the routing logic means. Therefore the definition of these routing groups is semi-permanent and can, as a rule, not be used to address irregular groups of output ports which are only used by a limited number of the handled cells.

A further object is therefore to propose a routing logic means which allows to controlledly distribute the cells over any number of outlets of a switching element.

This further object is achieved thanks to the fact characterized in that said routing logic means includes preselection means which preselect under the control of said internal routing label at least one set including from one to all of said routes and selection means to select a said selected route out of each thus preselected set.

With respect to the routing logic means it is clear that by identifying a set of routes by means of the internal routing label associated to the cell and by then selecting a route from this set, a cell may be transferred to any outlet of a group of outlets which is larger than a group of outlets as defined by a routing group but which is smaller than the total group of outlets of a switching element. This increases the transmission possibilities of the cells in the way needed in the above node by choosing the set of routes in such a way that it reflects the distribution tree for these cells in the various switching elements, i.e. such that the set of routes corresponds to a set of preselected branches for each of the switching elements and so provides a required branchpoint for the routing of the cells to the group of output ports via the distribution tree.

It can be appreciated that the latter routing logic means increases the flexibility of the switching element also irrespective of its above use by allowing to define a set for a specific number of cells only. Such sets can, contrary to the routing groups whose definition is semi-permanent owing to the specific interconnection within the switching network, be continuously reprogrammed to satisfy the routing needs of specific cell streams transferred by the switching network. A part of the intelligence of the switching node is in this way distributed over its switching elements since the latter are able to make, dependent upon the internal routing label, routing choices which otherwise would have to be made in a centralized way, i.e. the choice to select a specific route. Such a distribution of intelligence is in the present field regarded as a guarantee for efficient and flexible operation.

Characteristic features of the routing logic means are that said preselection means is a routing memory the memory locations of which are addressed by a route reference number included in said internal routing label, each of said memory locations identifying routes of a distinct said set and that said routing logic means is also adapted to select a plurality of routes, said selection means thereto being controlled by a routing indicator, derived from said internal routing label, for selecting either one or all of the routes included in said set.

In the above way a very flexible way of addressing a set based on the routing data is achieved. Reprogramming of these sets can moreover be done very easily via the routing memory.

More importantly however, the above features allow the invention to be implemented very advantageously. Indeed, from the last mentioned patent application it is clear that the routing logic means should support point-to-multipoint or multicast connections. This can be achieved, as is clear from the known routing logic means, via a routing memory in whose memory locations a plurality of routes are identified and by selecting all routing groups of this plurality. The latter features then clearly indicate that, thanks to the fact that both the above described routing and the present point-to-multipoint routing need similar resources, the single routing memory can be used to perform both types of routing when the selection means is suitably controlled via the above routing indicator. In this way it is more particularly achieved that the present routing logic means can be simply implemented in starting from the known routing logic means.

Yet a further characteristic feature of the routing logic means is that in each of said memory locations a distinct selection frequency value is associated to each route included in one of said distinct sets and in that the relative frequency with which one of said routes is selected from said one distinct set by said selection means is proportional to the selection frequency value associated to said one route.

In this way, the relative frequency with which distinct routing groups within the context of a particular set of routing groups are selected may differ between these distinct routing groups. The routing logic means will hence perceive these distinct routing groups as having different bandwidth capacities.

A first example in which such different bandwidth capacities might exist is when one of the outlets of the switching element cannot be used. If a routing group which includes the latter outlet is also included in a set of routing groups, the total traffic load on this set can only be maximized, without risking information loss, if the selection frequency values are so adapted that the relative frequency with which this routing group is selected is smaller than that with which the other routing groups are selected. Indeed, if the relative frequencies would be equal all these latter routing groups would have to be underloaded as if they too would have one outlet which could not be used.

A second example arises in connection with a node of the above type when the set of routing groups is used to address a group of output ports. Indeed, without selection frequency values each routing group of such a set should have to be connected to a number of output ports together offering an equal bandwidth which might considerably limit the number and kind of groups which could be so addressed.

Therefore a very important feature of the switching node is that said selection means selects one of said preselected branches under the control of a selection frequency value which is so determined that the probability of selecting each of said preselected branches is proportional to the bandwidth of those of said output ports of said group accessible via the thus selected branch.

In defining the selection frequency values in this way it is clearly achieved that the branches and hence also routes originating in each switching element may be connected to output ports of the group together offering an arbitrary amount of bandwidth.

A further feature of the routing logic means of the present invention is that said routes have different sizes, each of said outlets belonging to a plurality of routes each of which has a different size and that a route size indicator is used to indicate to said selection means that only the routes of a specific size are to be considered.

It may be verified that in this way and for larger routes, of which there are obviously less, a larger number of bits is available in a memory location of the routing memory to specify the selection frequency values. Therefore also can the refinement as described above be still improved for these larger routing groups which is particularly advantageous as the need therefor is larger for such larger routes as may be intuitively understood.

Also can such a definition of the routes already in itself improve the flexibility of the routing since a form of controlled distribution is inherently available thanks to the fact that the larger routes can be so defined to encompass a number of smaller routes.

A further important aspect of the present invention is that said routing logic means is also adapted to select one of said routes by identifying it via combinatorial routing logic based on an output address included in said internal routing label, the selection of said output address being based on data also included in said routing data.

Whilst the above new routing type may for point-to-point connections be theoretically applied for all cells that are handled by a switching element, this would result in a required capacity of the routing memory that is prohibitively large for it to be integrated on the same integrated circuit as the other circuits of the switching element with current state of the art technology. Indeed, the routing memory would approximately have to have a memory location for each group of output ports supported by the switching network.

Since a separate integration of the routing memory would lead to serious commercial and technical drawbacks, a second circuit for point-to-point connections, already known from the last referenced application and using combinatorial logic, is included in the routing logic means. The capacity of the routing memory can then be reduced to only those applications strictly requiring it. In this way the capacity of the routing memory can be so reduced as to make it feasible for this memory to be integrated on a same integrated circuit as the rest of the switching element.

According to another feature of the switching node, said selection means selects one of said preselected branches via a time dependent algorithm.

In this way the node decorrelates in time the cells that it receives consecutively and which are addressed to the same group of output ports and so avoids some output ports of a group being overloaded relative to the others, as would be possible if the algorithm were to select the same branch for several consecutive cells.

In accordance with yet another feature of the node, said selection means selects one of said preselected branches via an algorithm that is dependent on the position of said switching element in the stage of which it forms part.

The node is thus able to decorrelate in space cells arriving simultaneously at switching elements of a same stage or at inputs of the same switching element.

Yet a further characteristic feature of the present asynchronous switching node is that a said internal routing label of other said cells is such that at least one of said routing logic means performs a full distribution over the outlets of the switching element of which it forms part so as to address a said group of output ports.

As is clear from the above, the exclusive use of the new routing type according to the present invention leads to a number of sets to be included in the routing memory of each switching element which is in a first approximation equal to the number of groups of network outputs provided for in the first switching network. As already mentioned above such a large routing memory is not commercially feasible.

Therefore, by allowing also the known method of addressing the groups of network outputs by distribution, only those groups of network outputs which really require the advantageous features of the new routing type will require a set to be entered in the routing memory. In so doing the commercial feasibility of the present invention can already be procured with current state of the art technology.

An extremely important feature of an asynchronous swicthing node according to the present invention is that said internal routing label of said cell identifies a multicast tree comprising a plurality of said distribution trees, said preselection means selecting according to said internal routing label a plurality of sets of branches, each of said sets including all of said branches connected to said switching element and belonging to distinct ones of said plurality of distribution trees, said selection means selecting a branch per said set of preselected branches and said routing logic means further also including multicast means for transferring a copy of said cell on a route on each thus selected branch outgoing from said switching element.

The latter feature obviously also allows the use of the above new routing method also for point-to-multipoint or multicast connections such that the copies of cells which are so routed can advantageously be routed to irregular groups as well as to isolated output ports or regular groups. The above routing logic means can be adapted in a straightforward way to provide for this type of multicast capacity by simply allowing a plurality of sets of routes to be defined in a switching element, each of these sets being used for the routing of one of the copies of the cell.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
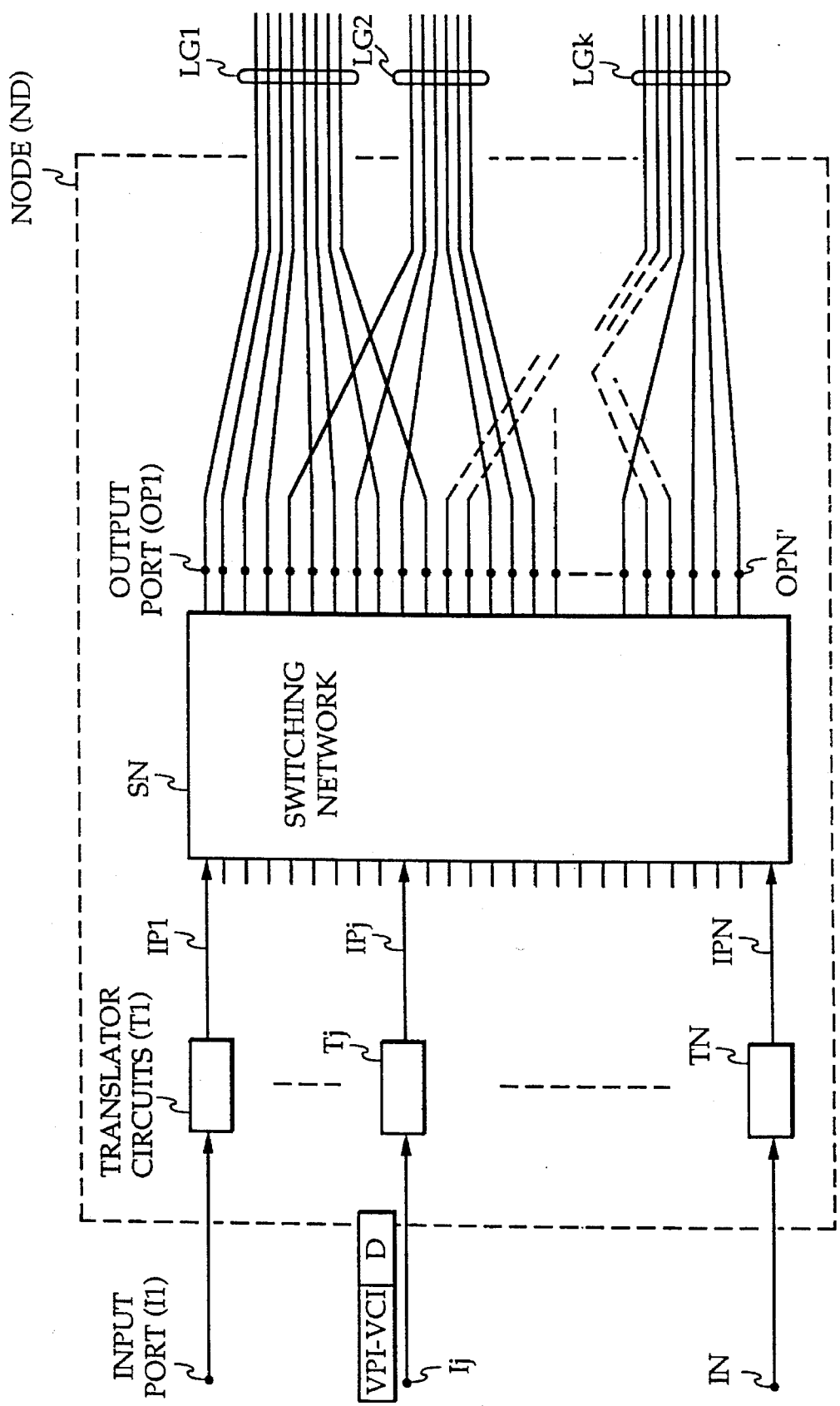
FIG. 1 shows a block diagram of a switching node in accordance with the present invention.

The embodiment of the invention shown in FIG. 1 is a node ND which connects N input ports I1, . . . , Ij, . . . , IN to N' output ports OP1, . . . , OPN' connected to links grouped in any way: LG1, . . . , LGk. Consider first the situation in which a cell is addressed to a single irregular output group, group LG1 for example. This cell is routed by switching elements in the node ND according to internal routing data contained in an internal routing label associated with the cell when it enters the node. The internal routing data is deduced from external routing data which may be implicit (position of the cell in a time-division multiplex) or explicit (virtual path and circuit identifiers, VPI-VCI).

The embodiment of the invention shown in FIG. 1 comprises:

a switching network SN having N' network outputs OP1, . . . , OPN' coupled to like named output ports of the node ND and having N network inputs IP1, . . . , IPj, . . . , IPN, and N incoming terminal modules made up of translator circuits T1, . . . , TN each having an input and an output and connected between respective input ports I1, . . . , IN of the node ND and the network inputs IP1, . . . , IPN of the switching network SN1.

The following description uses the concept of node output port groups, network output groups and output link groups of the node ND interchangeably. By virtue of how a group is defined, any cell addressed to one of the groups of links LG1, . . . , LGk may be sent to any of the output ports OP1, . . . , OPN connected to one of the links of this group.

Each incoming terminal module T1, . . . , TN translates external routing data, for example a connection identifier VCI-VPI comprising a virtual circuit identifier VCI and a virtual path identifier VPI, and supplies for each cell of a connection internal routing labels which are identical for all the cells of that connection. This label defines a single distribution tree. A distribution tree is a set of branches in which each branch comprises all the routes that can be used to route one copy of a cell from the input port of the node which received the cell to one of the output ports of the node of the group of output ports to which the cell is addressed.

A distinction must be drawn between two situations:

if the network SN is of the single-path type with translation type routing, the internal routing label comprises a new value of the connection identifier VPI-VCI which is written by a translator device T1, . . . , TN in the header of the cell in place of the old value; this connection identifier is translated in each switching element that the cell encounters to identify the branches of the distribution tree of that cell outgoing from that switching element; the routing logic means of each switching element includes a translation memory whose content is updated each time a new connection is set up;

if the network SN is of the single-path or multipath routing type, the internal routing label comprises the link group address (LGA) of the group of output ports of the network SN to which the cell is addressed; this address is added to the cell before its header; it is analyzed in each switching element that the cell encounters in order to extract from it a field identifying directly the branches of the distribution tree outgoing from that switching element.

Figure 2:
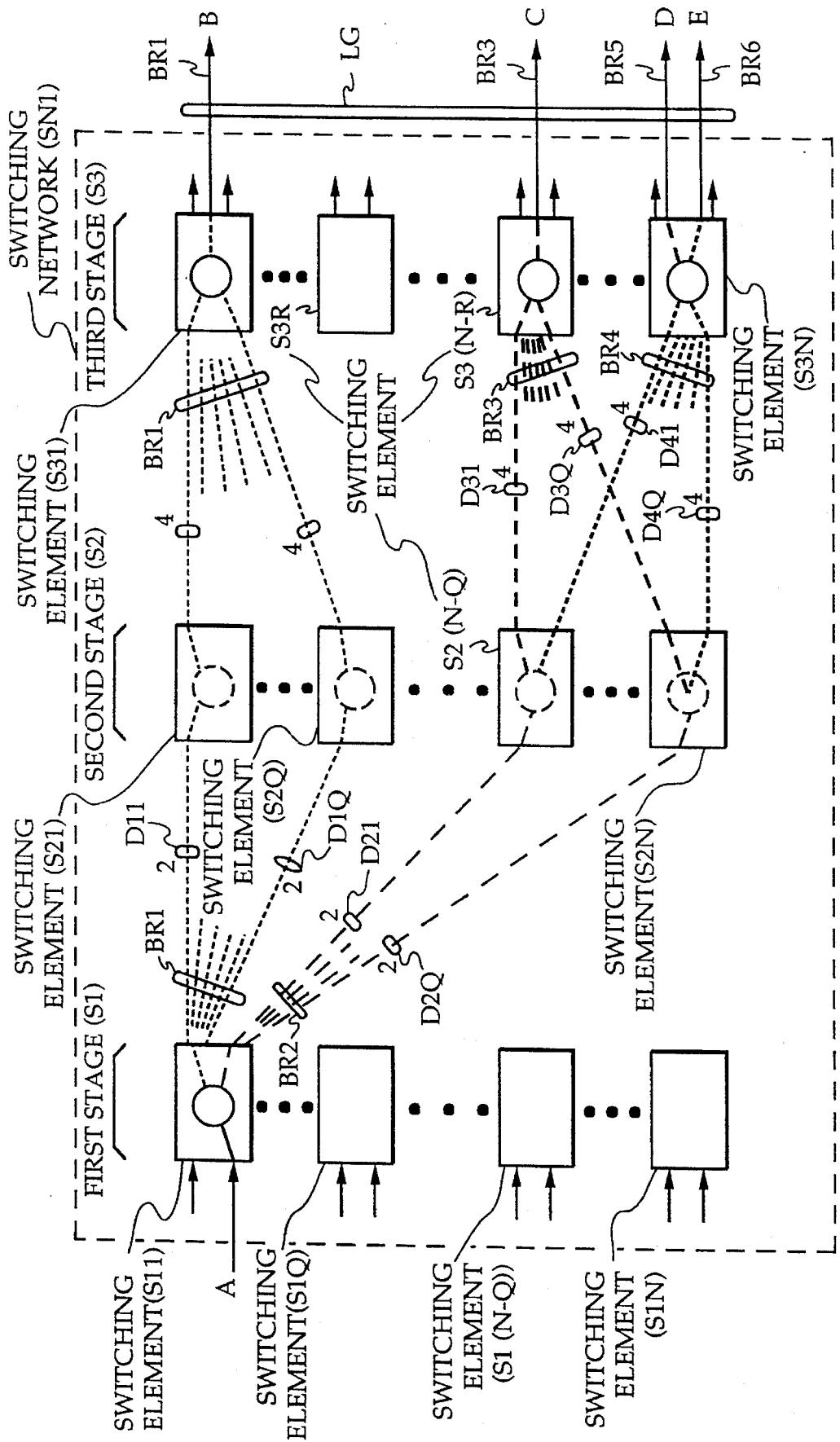
FIG. 2 illustrates the definition of a branch and a distribution tree.

FIG. 2 illustrates the definition of a distribution tree and a branch. It is a diagram showing the switching elements of a network SN1 effecting only point-to-point routing. The situation of point-to-multipoint routing or multicasting is discussed later. FIG. 2 shows a distribution tree for cells arriving at an input A and addressed to a group LG comprising four output ports B, C, D, E.

The network SN1 is constituted by a first stage S1 comprising switching elements S11 through S1N, a second stage S2 comprising switching elements S21 through S2N and a third stage S3 comprising switching elements S31 through S3N. In this example each switching element S11 through S1N is connected to each element S21 through S2N by two links. The switching elements of the second and third stages S2, S3 are grouped into a plurality of planes. In each plane Q switching elements of the second stage S2 are connected to R switching elements of the third stage S3 and are not connected to switching elements of other planes. In a plane each switching element of the second stage S2 is connected to each switching element of the third stage S3 in the same plane by four links.

A distribution tree for a given input port and a given group of output ports is the set of branches enabling a cell to be routed from the given input port to any one of the output ports of the group and grouping in each branch of this tree all the groups which are equivalent in routing terms, i.e. which enable the cell to be routed to the same output port or to the same sub-group of outputs. In other words, after a branch has been chosen in the distribution tree the outgoing route from the switching element on this branch is selected implicitly. The choice of a particular output within the route corresponding to a selected branch affects only the distribution of traffic within the switching network.

In the example shown the switching element S11 is a branchpoint from which extend only two branches BR1 and BR2. The outgoing route corresponding to the branch BR1 comprises Q directions D11, . . . , D1Q each made up of two links and providing access to the output port B. The outgoing route corresponding to the branch BR2 comprises Q directions D21, . . . , D2Q each comprising two links and providing access to the output ports C, D, E. The branch BR1 passes straight through the switching elements S21 through S2Q without further branching. These switching elements do not generate any new branch different from BR1 in the distribution tree. The same applies to the switching element S31. The branch BR1 accesses the output port B without any real branching.

The set of switching elements S2(N-Q) through S2N is a branchpoint which generates two branches, namely a branch BR3 providing access to output port C and a branch BR4 providing access to output ports D and E. The outgoing route corresponding to branch BR3 at the output of the second stage comprises Q directions D31, . . . , D3Q each comprising four links. The outgoing route corresponding to branch BR4 comprises Q directions D41, . . . , D4Q each comprising four links.

The branch BR3 also passes straight through the switching element S3(N-R) without further branching. The branch BR3 goes to the output port C without branching in the element S3(N-R). The switching element S3N is a branchpoint because here the branch BR4 divides into a branch BR5 going only to the output port D and a branch BR6 going only to the output port E.

The links of branches BR1 through BR6 are shown with six different symbols so that each can be distinguished in the distribution tree.

In this example distribution entails first choosing dynamically branch BR1 or BR2 in the first stage; when the branch BR2 is chosen, for example, distribution at the second stage then consists in choosing branch BR3 or BR4. Whether the cell reaches one of the switching elements S2(N-Q) to S2N, it is the same branches BR3 and BR4 which constitute the choices offered. If the branch BR4 is chosen for example, distribution then consists in choosing in the third stage branch BR5 or BR6 leading to a single output ports D or E. Choosing a particular link within a route corresponding to a selected branch does not alter the destination reached.

Figure 3:
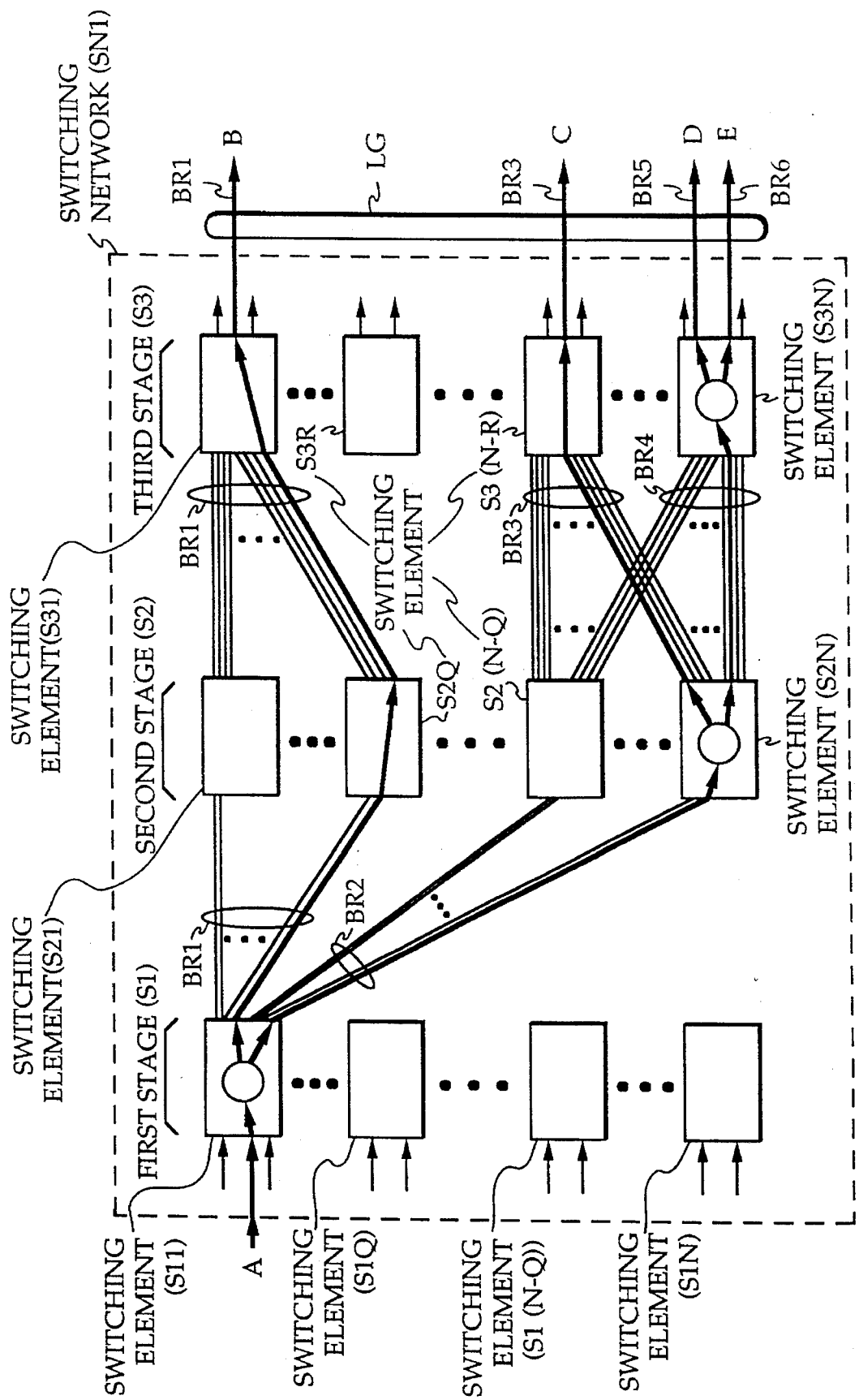
FIG. 3 illustrates the operation of the switching node shown in FIG. 1 when it includes a single-path switching network.

FIG. 3 illustrates the operation of the first embodiment of the node in accordance with the invention in the situation where the node comprises a single-path type network SN1. To route a cell from an input port A to an output port B, for example, there is a single path which is predetermined when the connection to which the cell in question belongs is set up.

If the destination is a group of output ports B, C, D, E there are several possible paths depending on the branches taken. FIG. 3 shows all links able to route a cell from the input port A to one of the output ports B, C, D, E of the output group LG, in other words all of the links which can constitute the branches BR1 through BR6. When the connection to which the cell in question belongs is set up the node preselects a particular distribution tree comprising a single link for each branch of the distribution tree set up for the connection. These predetermined links are shown in thick lines. The other links which could have been used to constitute the branches but which were not selected are shown in thin lines.

In accordance with the invention, if the switching element S11 receives a cell it identifies all the branches outgoing from it according to the internal routing label comprising either an output group address LGA added to the cell or a connection identifier VPI-VCI in the cell header. In the former case translation of the address LGA identifies the branches BR1 and BR2. In the latter case the connection identifier VPI-VCI identifies the branches BR1 and BR2 directly.

The switching element S11 then chooses between these two branches using an algorithm to be described later. A translation table then identifies the route outgoing from the element S11 corresponding to the branch chosen. In this case it identifies the predetermined link constituting this branch (predetermined in the sense that it was chosen when the connection was set up).

Assume that the branch BR2 is chosen, for example, and that the predetermined link constituting this branch is one of the two links connecting the elements S11 and S2N. When the switching element S2N receives the cell, it identifies all the branches BR2, BR4 outgoing from it on the basis of the internal routing label. It then chooses dynamically between these two branches using the same algorithm to be described later. A translation table then identifies the route outgoing from the element S2N corresponding to the branch chosen. This table identifies directly a predetermined link constituting this branch (predetermined in the sense that it was chosen during setting up of this connection). It is one of the links connecting the elements S2N and S3N for example.

When the switching element S3N receives the cell it identifies all the branches BR5 and BR6 outgoing from it on the basis of the internal routing label. It then chooses dynamically between these two branches using the same algorithm to be described later. It chooses the branch BR5 for example. The translation table then identifies a route outgoing from the element S3N corresponding to the chosen branch BR5. In this example the table identifies directly the single link constituting the branch BR5. The cell is thus routed to the output port D.

Figure 4:
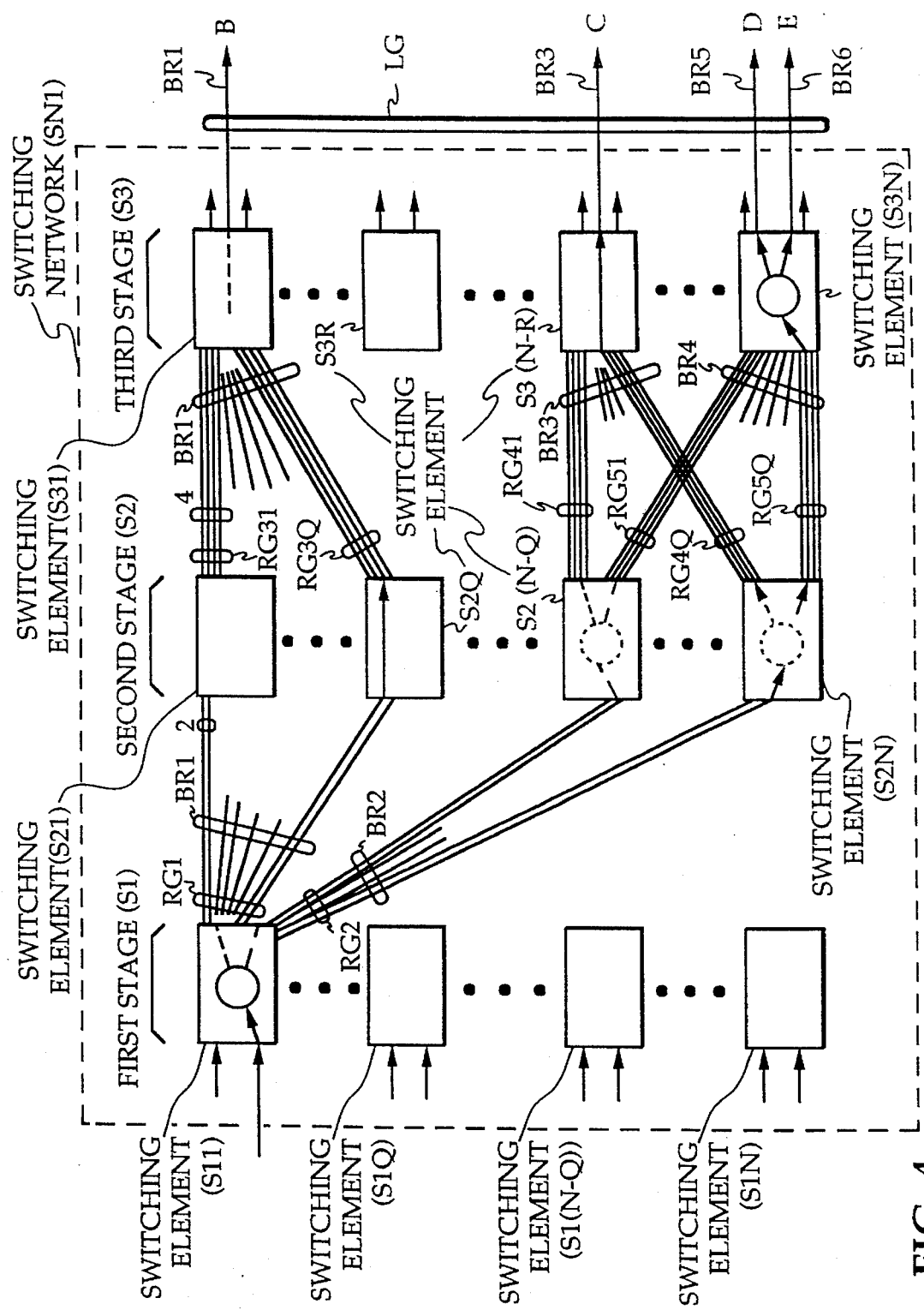
FIG. 4 illustrates the operation of the switching node of FIG. 1 when including a multipath switching network.

FIG. 4 illustrates the operation of the first embodiment of the node in accordance with the invention in a situation in which the network SN1 is of the multipath type. FIG. 4 shows all links which can route a cell from the input port A to one of the output ports B, C, D, E of the output group LG. Because of the multipath routing possibility all these links can be used dynamically to route each cell to any output of the group LG. For this reason they are all shown in thick lines.

When the connection in question is set up, the node predetermines for each switching element the route corresponding to each branch outgoing from that element. At the output of the first stage S1 the route corresponding to the branch BR1 comprises a routing group RG1 comprising two links from the element S11 to each of the switching elements S21, . . . , S2Q. At the output of the second stage the possible paths of the branch BR1 comprise N routes which are N respective routing groups RG31, . . . , RG3N outgoing from the respective elements S21, . . . , S2Q and converging towards the element S31. At the output of the element S21, for example, the route corresponding to the branch BR1 comprises a routing group RG31 comprising four links to the element S31. At the output of the third stage a route corresponding to the branch BR1 comprises a single link going to the output port B.

At the output of the first stage S1 the route corresponding to the branch BR2 comprises a routing group RG2 comprising two links to each of the Q+1 switching elements S2(N-Q), . . . , S2N. At the output of the second stage S2 the possible paths of the branch BR3 comprise Q routes which are Q respective routing groups RG41, . . . , RG4Q and the route corresponding to the branch BR4 comprises Q routes which are Q respective routing groups RG51, . . . , RG5Q. At the output of the third stage the route corresponding to the branch BR3 comprises a single link to the output port C, the route corresponding to the branch BR5 comprises a single link to the output port D and the route corresponding to the branch BR6 comprises a single link to the output port E.

In accordance with the invention, when the switching element S11 receives a cell it identifies all the routes outgoing from it on the basis of the internal routing label comprising an output group address LGA added to the cell when it enters the node. The switching element S11 translates the address LGA to identify the branches BR1 and BR2 of the distribution tree outgoing from this switching element. The switching element S11 then chooses between these two branches using an algorithm to be described later. A translation table then identifies the route outgoing from the switching element S11 corresponding to the chosen branch. If the branch BR2 is chosen for example, the translation memory identifies the route comprising the routing group RG2 comprising four links whose common destination comprises the output ports C, D, E. Selection inherent to the switching element S11 then chooses one of the four links constituting the routing group RG1. This latter selection is inherent to multipath switches and may be random for example.

For example, assume that the link chosen is one of the two leading to the switching element S2N. The latter translates the address LGA to identify the branches BR3 and BR4 of the distribution tree outgoing from the switching element S2N. It then chooses between these two branches using the algorithm to be described later. A translation table then identifies the route outgoing from the switching element S2N corresponding to the branch chosen. If the branch BR4 is chosen for example, the translation memory identifies the route comprising the routing group RG5Q comprising four links whose common destination comprises the output ports D and E. A selection inherent to the switching element S2N chooses one of the four links constituting the routing group RG5Q.

When the switching element S3N receives the cell, it translates the address LGA to identify the branches BR5 and BR6 of the distribution tree outgoing from it. It then chooses between these two branches using the algorithm to be described later. Assume that it chooses the branch BR6 for example. A translation table then identifies the only outgoing route from the element S3N corresponding to the branch BR6. This route comprises a single link to the output port E of the network SN1. The cell is therefore routed to the output port E.

Figure 5:
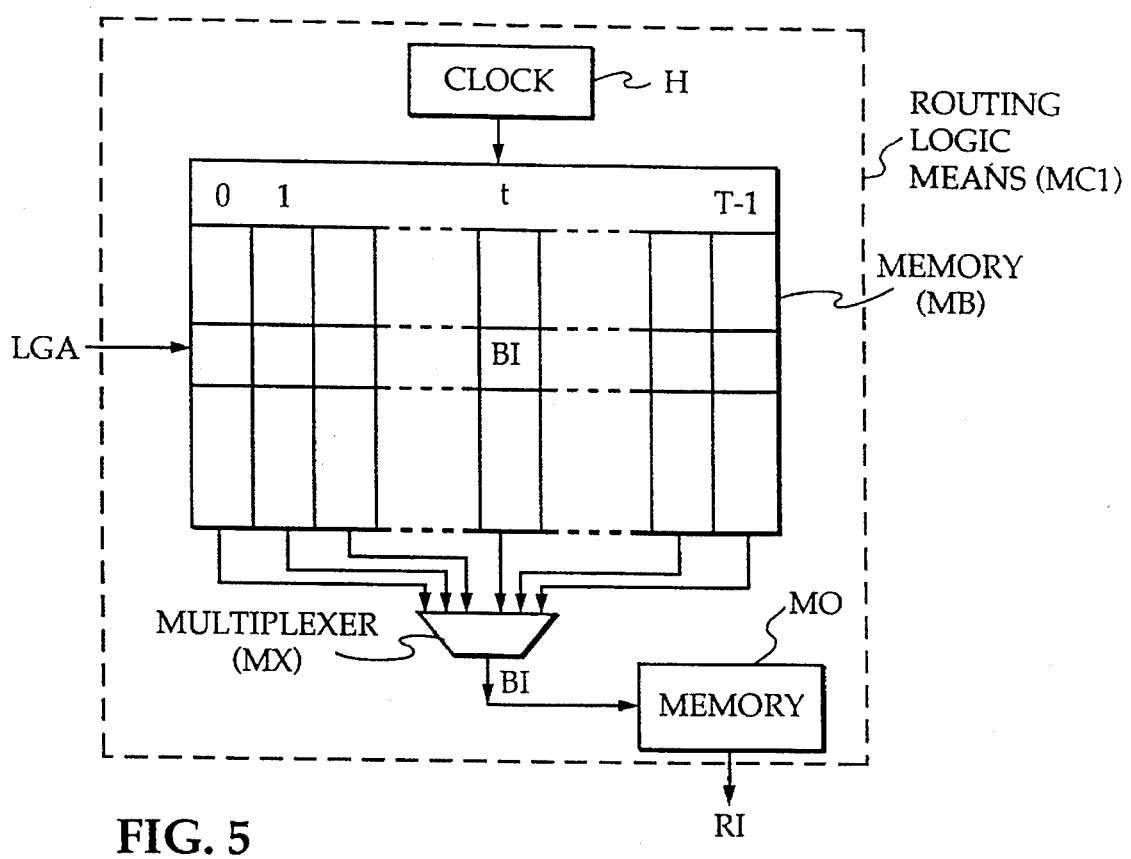
FIGS. 5 and 6 show the block diagram of first and second embodiments of a routing logic means according to the present invention and used in the switching elements of the switching node of FIG. 1.

FIG. 5 shows the block diagram of a device MC1 included in a first embodiment of a routing logic means included in each switching element of the network SN1 where the latter is of the self-routing type. The device MC1 is used to identify in two stages a route RI outgoing from a switching element that will be used to send a cell according to the internal routing label LGA associated with this cell when it enters this switching element. A first memory MB selects one branch BI from a plurality of branches outgoing from the switching element in question using an algorithm which is time-dependent and which is also dependent on the total bandwidth of the outputs of the network SN1 accessible via the selected branch. A second memory MO translates the branch identifier BI into a route identifier RI.

The memory MB is addressed simultaneously by the internal routing label LGA and by a value t supplied by a clock H at a timing rate corresponding for example to that at which cells are received at the inputs of the node and with a modulus T which is equal to 128 times the duration of a cell, for example. The memory MB has T columns corresponding to the values from t=0 through t=T−1. In each column there are as many rows as there are values LG1A identifying respective groups LG1, . . . , LGk of output ports of the node in question. Each row contains a certain number of copies of the branch identifiers belonging to the routing tree designated by the label LGA and obtained from the switching element in question. How these identifiers are chosen is explained later. A multiplexer MX selects the identifier BI read at the address consisting of t and LGA.

The memory MO is addressed by the branch identifier BI. It identifies a single route which is predetermined during setting up of the connection to which the cell in question belongs.

If the network is of the single-path type the identifier RI identifies an outlet of the switching element directly. If the network is of the multipath type the identifier RI identifies a routing group. In this latter case an outlet is selected from those constituting the routing group by another device (not shown) included in the routing logic means of the switching element and which operates independently of the device MC1. Selection may be random or it may be dependent on the filling of queues associated with the outlets of the switching element, for example.

Figure 6:
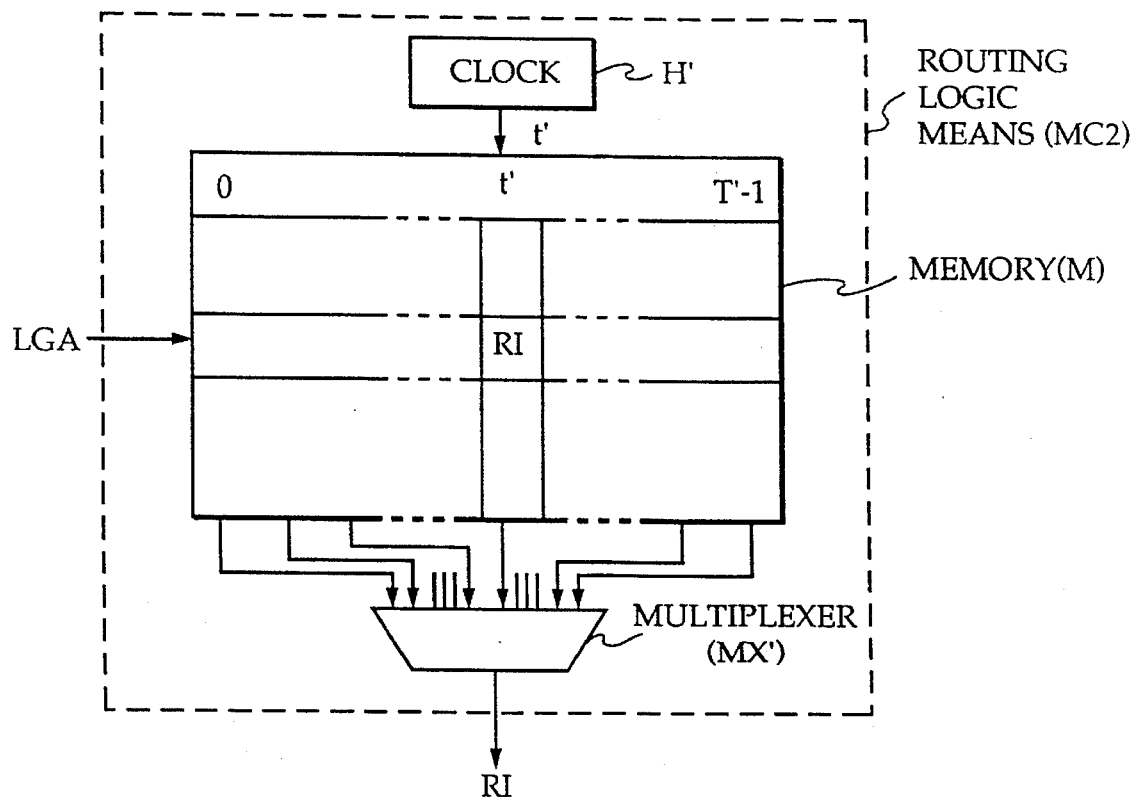

FIG. 6 shows the block diagram of a device MC2 included in a second embodiment of the routing logic means of each switching element of the network SN1. It identifies in one stage a route RI outgoing from a switching element and which will be used to send a cell depending on the internal routing label LGA associated with the cell when it enters the switching element.

The identifier BI of the selected branch is not determined explicitly. A memory M is addressed simultaneously by the label LGA and a time value t'. The latter is supplied by a clock H' at a timing rate corresponding to that at which cells are received at inputs of the node and with a modulus T" which is equal to 128 times the duration of a cell, for example.

The memory M comprises the same number of rows as there are values LGA identifying respective groups LG1, . . . , LGk. It has T' columns. A label LGA addresses a row. This enables implicit identification of the branches belonging to the tree designated by LGA outgoing from the element in question. Three of eight branches outgoing from the switching element, for example. The memory M does not contain the identifier of each branch explicitly, but contains the identifier of the route constituting the branch for the switching element concerned. The row concerned may contain multiple copies of the identifier of the route constituting a branch. How the number of copies of each identifier is chosen is explained later. It determines in part the selection algorithm.

The branch selection algorithm is explained below, initially on the assumption that it is dependent only on the time t.

Consider the data written into the memory MB in the embodiment shown in FIG. 5 for a situation in which the tree designated by LGA comprises three branches B1, B2, B3 among eight branches outgoing from the switching element concerned. If it is unnecessary to apply any weighting to the selection algorithm the data stored in the memory MB in the row at the address LGA may comprise:

```
t=  | 0   1   2   3   4   5  ...125  126  127
    |_____
    | B1, B2, B3, B1, B2, B3,...B3,  B1,  B2
```

It can be seen that the probability that one branch will be selected is practically equal to ⅓ for the three branches, to the nearest 1/43.

In a feasible alternative embodiment to decorrelate the cells in space, the explicit or implicit branch selection algorithm is further dependent on the position n of the switching element in the stage of which it forms part. For example, the time value t in the above tables is then replaced by the value of the parameter:

$$DDP = n+t \text{ (modulo } N)$$

where n is between 1 and the number N of switching elements in the stage to which the switching element concerned belongs.

The value of the parameter DDP is thus a random variable for procuring both time and space decorrelation in the dynamic choice of a branch for each cell in the distribution tree for routing the cell to any of the output ports of the node constituting an irregular group.

Figure 7:
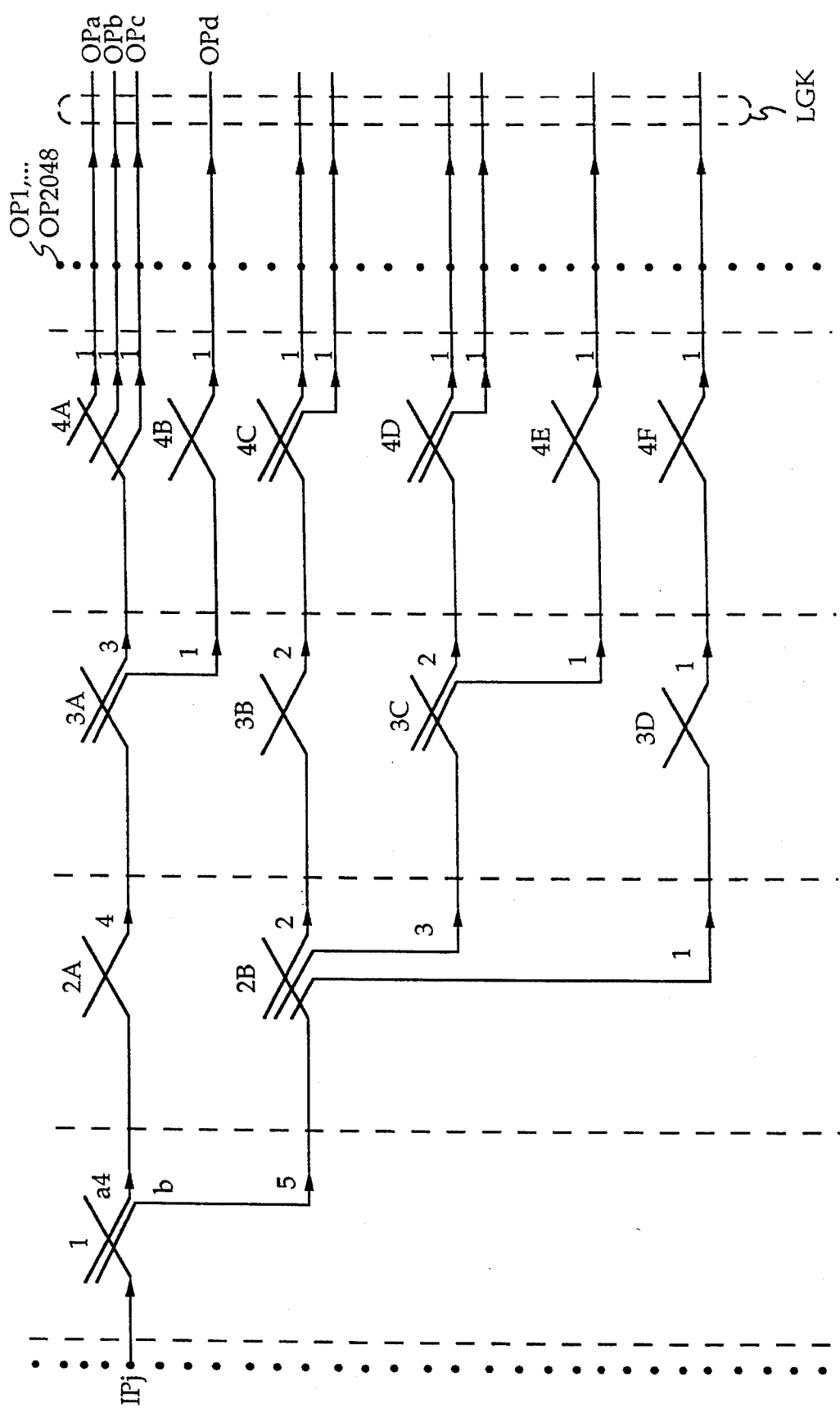
FIG. 7 shows the weighting applied by the branch selection algorithm in the latter two embodiments.

FIG. 7 shows the situation of a distribution tree having an irregular structure. The corresponding network receives on an input port IPj a cell having an internal routing label LGk designating a group of output ports OPa, OPb, OPc, OPd, etc which are assumed to have the same bandwidth. The figure shows only the switching elements 1, 2A, 2B, 3A, 3B, 3C, 3D, 4A, 4B, 4C, 4D, 4E, 4F which form part of this tree. A number adjacent each branch indicates the number of output ports in the group LGk accessible via this branch outgoing from the switching element.

The three branches outgoing from the switching element 4A, for example, each provide access to only one output port of the group LGk, which is also the case for all the branches outgoing from all the switching elements of the first stage. In the third stage, on the other hand, the switching element 3A (for example) has a first outgoing branch providing access to three output ports of the group LGk and a second outgoing branch providing access to only one output port of the group LGk. In the second stage the switching element 2B has three outgoing branches providing access to two, three and one output ports of the group LGk respectively.

It can therefore be seen that if selection is performed without weighting in the switching element 3A, for example, a cell passing through this switching element has one chance in two of reaching the output port OPd, one chance in six of reaching the output port OPb and one change in six of reaching the output portOPc. To obtain as balanced as possible a distribution to all of the output ports of the group LGk it is necessary to weight branch selection at the switching element 3A so that the first branch is selected three times more often than the second branch.

Similar weighting must naturally be applied to the selection process at the other switching elements. The weighting coefficients are respectively equal to the reciprocals of the number of output ports accessible, if the latter all have the same bandwidth. If not it is necessary to take into consideration the total bandwidth of the outputs of the node accessible via the branch in question.

Consider the data which may be stored in the memory MB of the device MC1 to obtain a 2/3/1 weighting e.g. with respect to the respective branches B1, B2, B3.

```
t= | 0  1  2  3  4  5  6  7  8  9  10 11 ...127
   |_____
   | B1, B1, B2, B2, B2, B3, B1, B1, B2, B2, B2, B3...B1
```

It can be seen that the probabilities that the branches B1, B2, B3 will be selected are practically equal to ⅓, ½ and ⅙, respectively.

The branch selection algorithm may be implemented without using tables like those stored in the memories MB, MO and M previously described. The devices MC1 and MC2 may each comprise a computing device such as a microcontroller, for example, which recomputes for each cell arriving at the switching element input the value of a pointer designating an outgoing route from this element on which the cell must be sent.

For example, to obtain the following list of identifiers:

B1, B1, B2, B2, B2, B3; B1, B1, B2, B2, B2, B3; ...

it is sufficient to program the microcontroller to:
supply the identifier B1 when it has counted one clock period (modulo 6),
supply the identifier B2 when it has counted three clock periods, four clock periods, five clock periods (modulo 6), and
supply the identifier B3 when it has counted six clock periods (modulo 6).

The man skilled in the art will choose one of the embodiments described previously according to the required compromise between the volume of memory to be used in the case of an implementation using look-up tables and the computing time required in the case of a computing type implementation.

If the output ports of the node do not all have the same bandwidth it is necessary to select those with the greater bandwidth more often. This additional weighting can be achieved in a manner similar to that described above to allow for an arbitrary number of output ports of the node accessible via a given branch.

In the examples of the network SN1 described with reference to FIGS. 3 and 4 a branch is selected in the three stages of the network. In an alternative embodiment it is possible to do this in a single stage, for example, and to perform in subsequent stages only a conventional selection equivalent to self-routing to a determined output port of the node or to a determined regular group of node outputs. In this latter case a stage comprises routing logic means which change the internal routing label by replacing the address LGA of an irregular group of outputs with an address of a single output or an address of a regular group of output ports of the node.

The node in accordance with the invention is also compatible with multicasting a cell to multiple destinations outgoing from the node, each possibly being made up of irregular groups of output ports. To enable multicasting in this way, the incoming terminal module T1, . . . , TN selects an internal routing label ARD which comprises the identifier of a multicast tree. Each multicast tree is a combination of several distribution trees each comprising the set of branches that can be used to route a copy of the cell to any output of the group of outputs to which the cell is addressed. In particular, a cell can be multicast to a plurality of irregular groups each receiving one copy of the cell at any output port of the irregular group.

Each of these distribution trees is similar to that described previously with reference to FIG. 2. There is a distinct multicast tree for each combination of destinations, obtainable by combining a plurality of predetermined groups of node output ports. Each multicast tree enables the routing of a copy of the cell to any of the output ports of the irregular group constituting each destination. The situation in which the destination is a single output port and the situation in which the destination is a regular group of output ports are special cases which are readily deduced from the general case in which the destinations comprise a plurality of irregular groups.

To enable multicasting, at least one switching element of the switching network needs to be capable of multicasting a cell according to a multicast tree identified by the internal routing label ARD. A switching element of this kind identifies at least one route outgoing from the element according to the internal routing label ARD associated with the cell and sends a copy of this cell on each of the routes so identified.

Figure 8A:
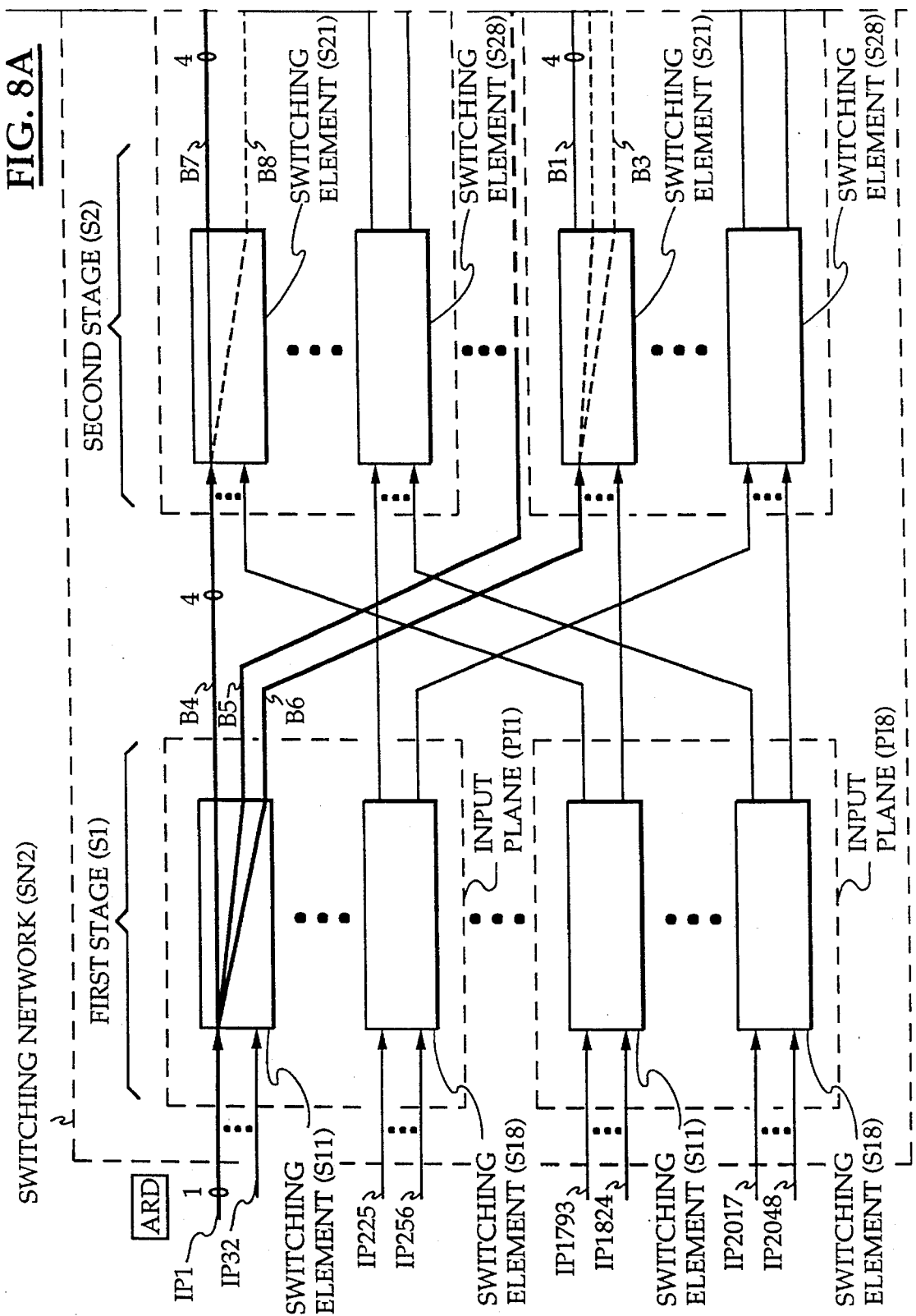
FIG. 8 illustrates the operation of a second node according to the present invention but now allowing multicast to a plurality of irregular output port groups.

FIG. 8 illustrates the operation of a second embodiment of the node in accordance with the invention comprising a switching network SN2 in which all the switching elements are capable of routing with multicasting. It comprises three stages S1, S2, S3 with a regular topology. The stage S1 comprises eight input planes PI1 through PI8 each comprising eight switching elements S11, ..., S18. The stages S2 and S3 are situated on eight output planes PO1, ..., PO8 which each comprise 16 switching elements, namely eight switching elements S21, ..., S28 for stage S2 and eight switching elements S31, ..., S38 for stage S3. Each switching element has 32 inlets and 32 outlets. The 32 outlets of each switching element of stages S1 and S2 are organised into eight groups of four outlets, each group being connected to a group of four links internal to the switching network SN2. Likewise, the 32 inlets of each switching element of stages S2 and S3 are organised into eight groups of four inlets.

FIG. 8 shows its operation in the case of multicasting of a cell to three destinations which comprise three irregular output groups: LG1, LG2, LG3. A multicast tree is shown in thick dashed line. The path actually taken by three copies of the same cell, taken as an example, is shown in continuous thick line.

The routing logic means of each switching element looks up in a memory similar to the memory M described previously with reference to FIG. 6 predetermined data at the address ARD which identifies:

the number of copies of the cell to be sent by the switching element concerned, and for each copy, the identifier RI of a route which can carry it.

The process of selecting a branch and then a route and then an output for each copy is identical to that previously described for routing a single copy of a cell.

If a copy can be routed by more than one branch the routing logic means selects one of these branches using an algorithm whereby the probability of selecting each branch is proportional to the total bandwidth of the output ports of the node accessible via the selected branch; this may depend on time and on the position of the switching element in the stage to which it belongs.

If the route selected comprises a routing group, a third and for example random stage of selection selects one output from the outputs of this routing group.

In the example shown in FIG. 8 a cell is applied to the input port IP1 with an internal routing label comprising the identifier ARD of a multicast tree for routing it as follows: a first copy of this cell to the irregular output group LG1, a second copy of this cell to the irregular group LG2 and a third copy of this cell to the irregular group LG3. In this example the label ARD commands the generation of three copies of the cell in the switching element S11 of the plane PI1 of the first switching stage S1. These three copies are to be sent by three branches B4, B5, B6 providing access to the respective groups LG1, LG2, LG3. There is no branch selection required at this level as there are only the three branches B4, B5, B6 providing access to the respective groups LG1, LG2, LG3 in this example. Each branch B4, B5, B6 comprises a single route comprising four links. The element S11 selects at random one of the four outlets generating the branch B4 and then sends a copy of the cell to this outlet. It does the same in parallel for the branches B5 and B6.

The first copy of the cell passes through the switching elements S21 and S31 of the plane PO1 without other copies being generated. The routing logic means of S21 of the plane PO1 identifies two branches enabling the first copy to access the group LG1, namely the branches B7 and B8. It selects one of these branches, the branch B7, for example, which comprises a route comprising four links. It selects at random one of the four outlets from which this route proceeds and transfers the first copy of the cell to it. The switching element S31 of the plane PO1 then receives the first copy of the cell. The routing logic means of S31 identifies a plurality of branches belonging to the multicast tree ARD. These branches provide access to the respective outputs of the group LG1. It selects one of these branches (B9) and transfers the first copy of the cell to it.

The second copy is routed in a similar way to one of the output ports of the group LG2. The third copy is routed in a similar way to one of the output ports of the group LG3.

Note that multicasting a cell by means of a multicast tree obtained by combining a plurality of routing trees requires that the latter have no common branches. This is to avoid traffic peaks in the common branches. The groups of output ports of the node must be constructed accordingly.

Figure 9:
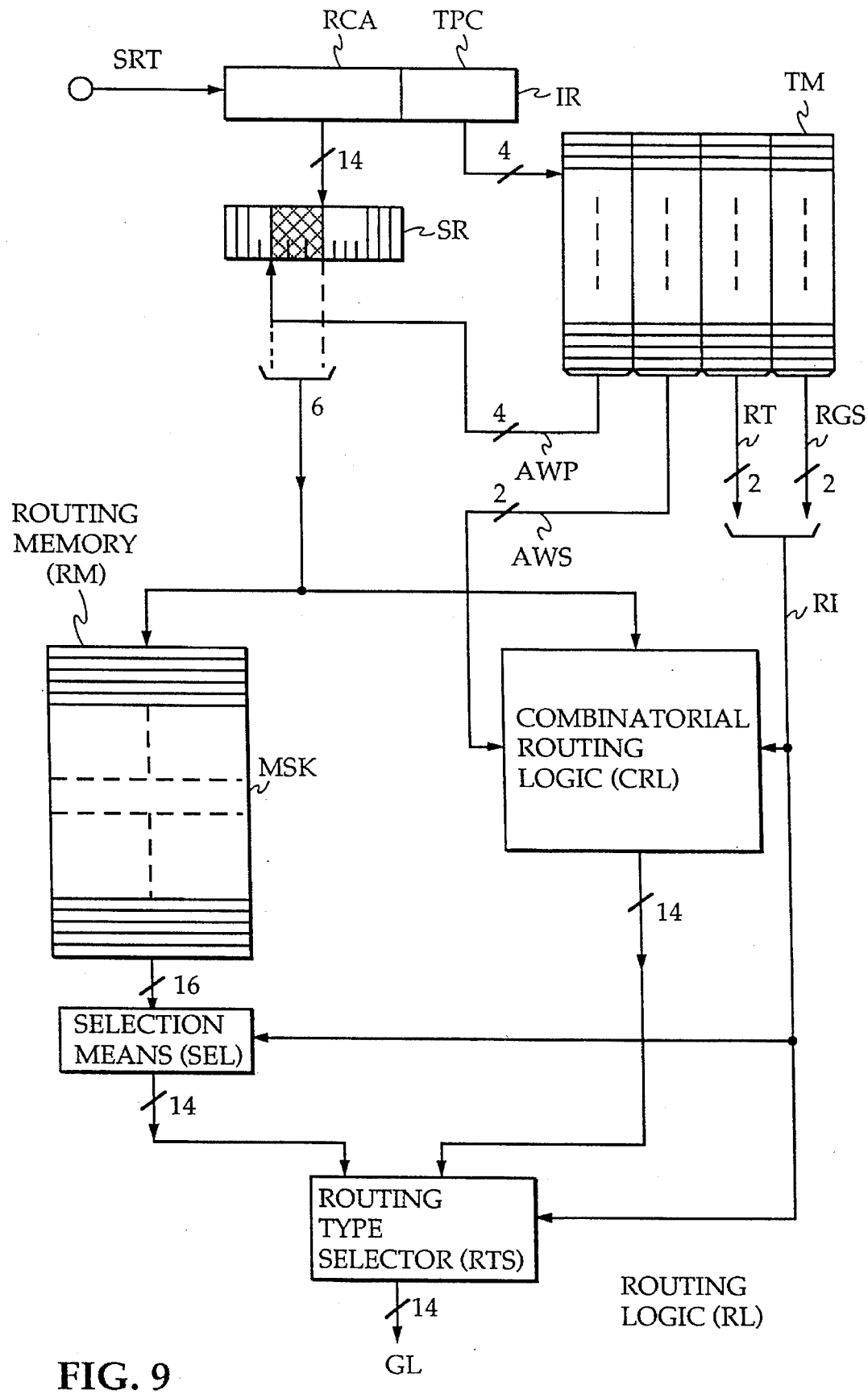
FIG. 9 shows the block diagram of a third routing logic means RL according to the present invention.
Figure 10:
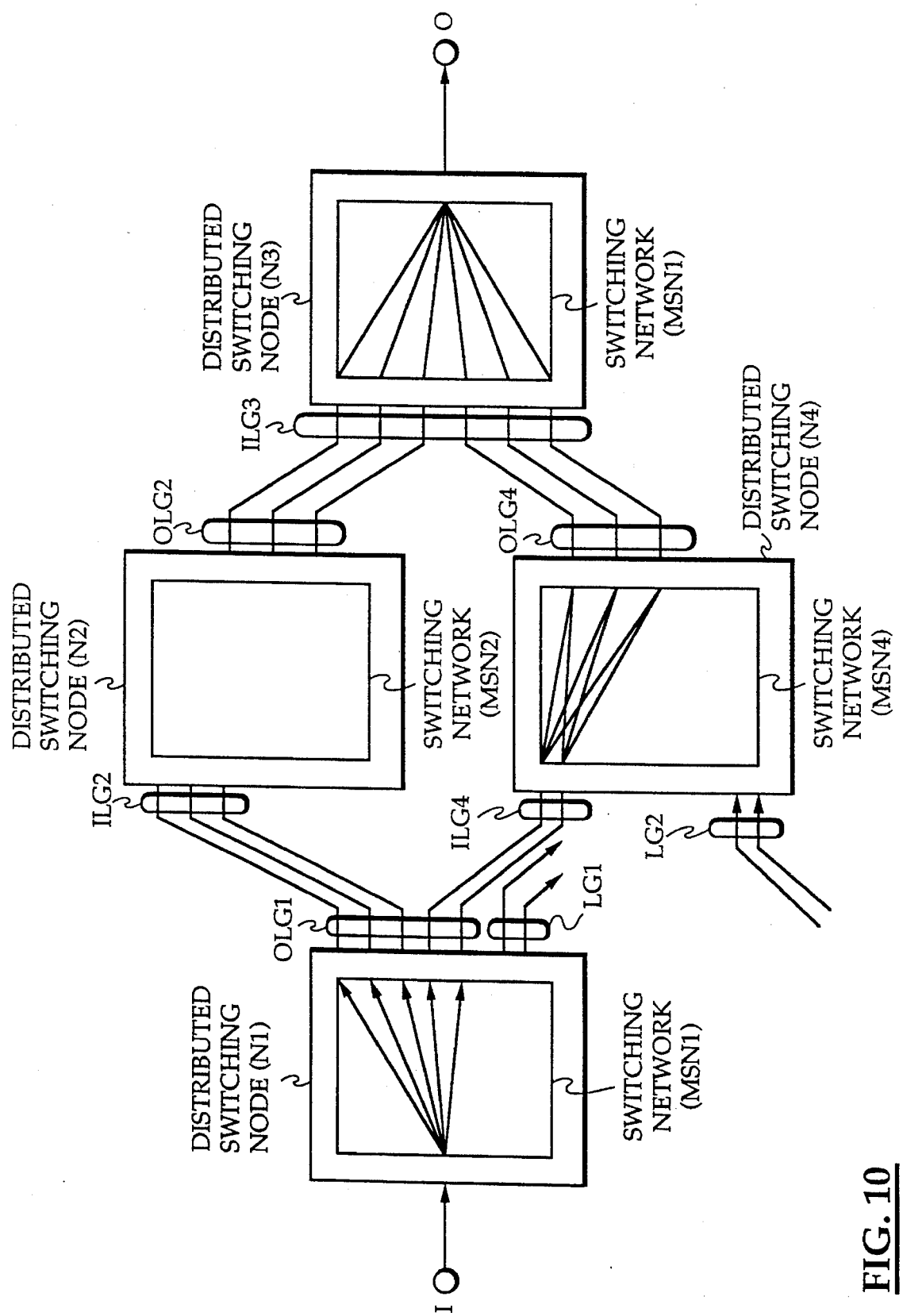
FIG. 10 shows a telecommunication system wherein the third routing logic means RL is used; and, FIG. 11 depicts a switching network SN of a third switching node N1, N2 or N3 shown in FIG. 10.

A third embodiment of both a switching node and a routing logic means in accordance with the present invention is described hereafter with reference to FIGS. 9 to 11.

The routing logic means RL depicted in FIG. 9 is preferably used in a switching element as disclosed in the published international patent application WO/91/02420 corresponding to U.S. Pat. No. 5,214,639 substituting herein the routing logic means described in the published European patent application EP/A1/0446493 corresponding to U.S. Ser. No. 07/668,582 which operates according to the same general principles as the present routing logic means. The above published applications are therefore incorporated herein by reference.

Since the present invention is particularly concerned with the internal operation of the routing logic means whilst the general operation principles of the switching element and the cooperation between the routing logic means and this switching element are described in detail in the two mentioned applications, the latter will be only briefly discussed here throughout the following.

The routing logic means RL derives from an internal routing label, henceforth also called self-routing tag SRT, applied on a like named input terminal a group routing signal GL also applied on a like named terminal. GL comprises 14 bits to each of which a distinct routing group is associated as described in detail in the above European patent application EP/A1/0446493. Each of the mentioned routing groups include a number of the 16 outlets of the switching element, the composition of each routing group being specified in a routing group table (not shown). The routing logic means can be seen externally as selecting based on the internal routing label, i.e. the self routing tag SRT, one or more of the mentioned routing groups by setting those bits of GL which correspond to these selected routing groups. Based hereon, i.e. on the output signal GL, the switching element can forward the information cell(s) associated to the mentioned SRT to one outlet of each selected routing group, such an outlet being chosen substantially randomly from amongst all the outlets within its routing group. It is to be noted that the above international application WO91/02420 describes in particular that the above is implemented by putting the information cell(s) in a queue corresponding to a selected routing group, each routing group being associated to one such queue.

The routing group table in the present embodiment specifies for instance 8 routing groups each including 2 outlets, 4 routing groups of 4 outlets and 2 routing groups of 8 outlets. These routing groups are so chosen that each outlet is included in exactly one routing group of a specific size.

The self routing tag SRT is written in an input register IR wherefrom a first part of SRT, called routing control address RCA and comprising 14 bits, is shifted into a shift register SR and a second part, called transfer pattern code TPC, is used to address a translation memory TM. The latter translation memory TM has 4 output signals named respectively address window position AWP, address window size AWS, routing tag RT and routing group size RGS and applied on like named terminals. The latter signals together form the content of a memory location of TM corresponding to the address included in the TPC. A first of these signals, the address window position AWP, determines which part of the RCA is relevant for the present switching element by controlling the shift register SR to apply the six bits of RCA on its output which correspond to bit positions AWP to AWP+5. This output is then both applied to a routing memory RM and combinatorial routing logic CRL which will be described hereafter.

The routing memory RM is addressed by the mentioned 6 bits outputted by the shift register SR, also called for this purpose route reference number, and forwards the 16-bit contents of the thus addressed memory location MSK to a selection means SEL. This selection means SEL derives herefrom a 14-bit candidate value for GL which is applied to a routing type selector RTS which selects between the latter and a second 14-bit candidate value for GL which is derived by the combinatorial routing logic CRL. RTS is for this purpose controlled by a routing indicator RI which comprises the mentioned routing tag RT and routing group size RGS and has as output the group routing signal GL.

The derivation of the mentioned first and second candidate values is achieved on the one hand by SEL under the control of the routing indicator RI and on the other hand by CRL under the control of both the routing indicator RI and the address window size AWS and will be described in detail hereafter.

First the operation of the routing memory RM in accordance with the present invention will be discussed. The present invention is indeed concerned with using this routing memory in such a way that the performance of the switching element is optimized particularly in terms of the routing flexibility it offers. More particularly, the present invention is aimed at improving this performance so that the routing of information cells is not confined to the above mentioned and predefined routing groups.

For the above purpose a routing function is included in the present routing logic means which operates via the routing memory RM. This routing function is indicated by the routing tag RT and controls the selection means SEL to interpret the content of MSK in the following way.

Dependent upon the routing group size signal RGS which indicates of which size, i.e. grouping 2, 4 or 8 outlets, the presently considered routing groups are, SEL will interpret the mentioned contents as 8, 4 or 2 groups of bits respectively. Each of these groups of bits in this way correspond to a particular one of the above listed routing groups and represent selection frequency values each corresponding to exactly one routing group.

In this way a set of routing groups, in the present case each of the same size, is formed including all routing groups with selection frequency values differing from zero. The selection means SEL is basically adapted to make a random selection of one of the routing groups included in the set specified via MSK and so defines a 14-bit wide signal which will be passed by RTS to GL in which exactly one bit which corresponds to the selected routing group is set since the present routing function indicated by RT so specifies.

It can be easily seen that, due to the latter routing function, the flexibility of the routing is no longer confined to the predefined routing groups. Indeed, a set of routing groups allows the information cell(s), associated to an SRT for which this set is activated, to be distributed over a number of outlets which are not as such included in a routing group and which do not comprise all outlets of the switching element. This set is moreover activated for all information cells associated to a specific SRT and such distribution can thus obviously be tailored to suit specific connections only. Sets can also be easily added/deleted in response to the emergence/disappearance of their associated connections without effecting the other connections. In this way it will also be avoided that an unfeasible amount of routing groups needs to be defined in the routing group table since the above mentioned sets will not be needed all simultaneously and since the basic routing groups, which can only be redefined affecting all connections passing through the switching element, naturally must only reflect the interconnection of a switching element within its switching network.

The above selection frequency values specified via MSK furthermore present significant advantages as such as the selection means SEL will select the routing groups included in a specific set with a relative frequency or probability which is proportional to this value. This results in the fact that within the context of a particular set the routing logic means will perceive the different routing groups within this set as having different bandwidth capacities. This can for instance be used advantageously when one outlet of a specific routing group is malfunctioning; without the refinement of the selection frequency values the total traffic load on a set including this routing group would have to be so diminished that the load on this specific routing group did not exceed its maximal load with one malfunctioning outlet. It can be easily verified that such diminishing results in underloading all other routing groups included in the set in such a way that they would have one excess outlet. However, in specifying the selection frequency values so that the probability of choosing the first mentioned routing group is smaller than the probability of choosing any of the other routing groups it can be verified that the traffic load via this set can be maximized, the maximal load being the total load which can be supported by all functioning outlets within the set, whilst no information loss ensues due to overloading the routing group including the malfunctioning outlet. It is to be noted that the above principle can be used e.g. also to refine the possibilities of a full distribution and that a number of its advantages will be described in detail with reference to the telecommunication system of FIG. 10 as will be the advantages of the above described routing function in general.

It is to be further noted that, due to the use of the routing group size signal RGS and due to the dimensioning of the routing groups as described above a number of advantages both in conjunction with the new features of the present invention and with known features such as multicast via the routing memory RM are procured. In the latter case for instance a larger choice can be provided within the multicast as will be described with reference to the multicast routing function. In the former case it allows to optimally refine the selection frequency values since for larger routing group sizes more bits are available to specify this value, which corresponds advantageously to the fact that it must be possible with such larger groups to define the probabilities in a more refined way whilst for smaller groups more coarse selection frequency values normally suffice.

The present routing logic means provides a number of other routing functions which were already known from the mentioned European patent application 0446493A1 and will therefore be only briefly discussed here mainly in order to point out the relationship between these known features and the above described inventive features and the added advantages provided because of this relationship.

A first known routing function accommodated by the routing logic means shown in FIG. 9 is the multicast routing or point-to-multipoint routing via the routing memory RM. If this routing function is indicated via RT, the selection means SEL will as before interpret specific groups of bits of the contents of MSK as associated to specific routing groups dependent upon RGS. Now SEL will not select one of the routing groups out of this plurality of routing groups specified by groups of bits differing from zero in MSK but will select all routing groups of this plurality and activate all corresponding bits in its output signal which is passed by the routing type selector RTS to GL. Such operation clearly results in a plurality of copies of the information cell(s), associated to an SRT resulting in such multicast routing, being forwarded each via different routing groups.

It is to be noted that an advantageous feature of the present invention is that the described point-to-point and point-to-multipoint routing functions can be simply achieved via one way, i.e. the routing memory RM and the selection means SEL. A further advantage is that, thanks to the routing group size signal, some form of controlled distribution, i.e. amongst a controlled number of outlets, can be achieved.

A further known routing function which can be performed by the present routing logic means is point-to-point routing based on an output address contained as such in the routing control address RCA. This function is performed by the combinatorial routing logic CRL for which reference is made to the mentioned European patent application 0446493A1. The mentioned output address will be in its simplest form the digital representation of the reference number of the routing group in the present routing logic means but can, as described in the latter application, also be a variable number of bits of RCA which have to be interpreted in accordance with information present in the routing indicator RI as will be briefly described hereafter.

A first way in which the number of bits of RCA needed to specify the output address indicating one of the routing groups can be diminished, is by using the routing group size signal RGS. Indeed, in specifying a specific size, not all 14 routing groups need be considered resulting in less bits to determine the actual routing group addresses via this specific RCA. It is to be noted that the address window size will in this case always cooperate with RGS in that it will indicate which of the 6 bits forwarded to CRL need be considered in order to derive the address of the routing group to be selected, it will e.g. indicate that only one bit needs to be considered if RGS indicates a routing group size of 8 outlets since in this case the selection needs only to take into account 2 routing groups.

A second way in which the number of bits of RCA needed can be diminished is by using AWS to still further reduce the number of routing groups from which one has to be selected.

For instance when RGS indicates a size of 2 outlets and AWS specifies that only one bit of RCA needs to be considered, the routing logic can be so configured to select one of the two routing groups with the lowest addresses of all routing groups having a size of 2.

If CRL has, in the above way, selected a routing group it will activate exactly one bit of its output signal corresponding to the selected routing group and RTS will under control of RI pass this output signal to the group routing signal GL.

It is to be noted that it was just the above described way of point-to-point routing selecting a routing group via combinatorial logic based on an output address contained in the routing control address RCA which resulted in this type of routing being confined to the predefined routing groups. The reason for the inclusion of CRL also in the present routing logic means lies in the low hardware cost of this way of routing. Indeed, when all information cells were to be routed via RM, the latter would become prohibitively large since substantially every connection to be supported by the switching element would require a separate memory location in RM. Such a large memory cannot be realized on a single integrated circuit. It is therefore very advantageous to include CRL in the routing logic means since such inclusion reduces the number of memory locations of RM thus making it possible for the switching element to be integrated on a single electronic chip.

As will be explained with reference to the switching network of FIG. 11 a hybrid form of routing where in some stages use is made of the output port address whilst in other stages the routing memory is used may also lead to an advantageous decrease of memory capacity needed for the above new way of routing. It has moreover to be noted in this respect that the routing groups, in case the output address routing via CRL is used, generally will not be of the partitioned nature described above in order not to limit the flexibility of this routing. The present invention however already provides enough flexibility so that, in principle, another definition than the partitioned one is no longer needed.

Finally also the routing function of distribution may be indicated by the routing indicator RI and this distribution may for instance be performed in the way known from the mentioned European patent application but it can also, as mentioned above, be performed via the routing memory RM where it may be refined using the earlier mentioned selection frequency values.

A final routing function is called physical routing and addresses specific outlets instead of routing groups. For this routing function reference is again made to the Published European patent application 0446493A1.

A very important application of the above described routing logic means is described hereafter with reference to FIG. 10 which shows a telecommunication system according to the present invention in whose nodes a switching element using the routing logic means described above is used. The telecommunication system shown in FIG. 10 includes geographically distributed switching nodes N1, N2, N3 and N4 which are interconnected by transmission links arranged in link groups OLG1, OLG2, ILG2, ILG4, LG1, LG2, OLG4 and ILG3. Each link group groups those links coming from a group of output ports or terminating in a group of input ports. The transmission links, and thus also the above specified link groups, may have a length of several kilometers.

The telecommunication system has input terminals connected to the inputs of the first switching node N1 and output terminals to which the outputs of the last switching node N3 are connected. Only one input terminal I and one output terminal O are shown in FIG. 10. The system is used for transferring cells, e.g. between subscriber sets (not shown) from the input terminal I to the output terminal O. Each cell includes a data field and a header which contains routing data relative to the destination of the cell, i.e. the output terminal(s) to which the cell is intended.

Each switching node N1, N2, N3 and N4, includes a respective switching network MSN1, MSN2, MSN3 and MSN4 which transmits the cell from an input port of the node to one or more output ports thereof according to the routing data, i.e. the self routing tag SRT, associated to the cell. Each switching network has network inputs to which the input ports of the corresponding switching node are connected and network outputs which are connected to the output ports of this switching node. In the following part of the description, a switching network will be generally indicated by MSN and the names network inputs and outputs will be interchangeably used with the names input and output ports respectively.

When for instance cells have to be transmitted from the input terminal I to the output terminal O, they first pass through the switching node N1 of which the switching network MSN1 distributed these cells over the network outputs of a group of network outputs (SOP) connecting to the transmission links of the output link group OLG1. This means that this cell may be transmitted by MSN1 to anyone of the network outputs of N1 connected to this SOP. Output link group OLG1 is connected to a group of network inputs (SIP) of MSN2 via an input link group ILG2, whilst the remaining transmission links are connected to a SIP of a switching network MSN4 of another switching node N4 via an input link group ILG4. MSN2 and MSN4 distribute the cells received at any network input of the SIP connected to respectively ILG2 and ILG4 to any network output of a SOP connecting to an output link group OLG2 and OLG4 respectively which leads to a SIP of MSN3. The transmission links of OLG2 together with the transmission links of OLG4 form an input link group ILG3 connecting to the SIP of MSN3.

Such an architecture allows to automatically maintain the cell traffic flow over (at least) one path N1, N2, N3 or N1, N4, N3 in case of failure detected on another one, i.e. on a link group (cable) ILG2, OLG2, ILG4 or OLG4 or on a switching node N2 or N4.

It is to be noted that FIG. 10 may represent only a portion of a larger telecommunication system wherein each switching network may have several groups of network outputs (SOP) connecting to distinct link groups, e.g. OLG1 and LG1 for MSN1, and/or may have several groups of network inputs (SIP) to which distinct link groups, e.g. ILG4 and LG2 for MSN4, are connected.

FIG. 11 shows an example of a 3-stage switching network MSN with a regular trunking topology. MSN has network inputs IP1 to IP1024 and network outputs OP1 to OP1024 to which are connected respective input ports and output ports of the corresponding switching node. The switching network MSN is constituted by a plurality of switching elements such as S11 to S18, S21 to S28 and S31 to S38 which are interconnected by bundles of 2 internal links each, each bundle being represented by a single line. As shown, the switching elements are arranged in stages S1, S2 and S3. The stage S1 is arranged on 8 input planes PI1 to PI8 which each carry 8 switching elements S11–18, whilst the stages S2 and S3 are both located on 8 output planes PO1 to PO8 which each carry 16 switching elements, i.e. 8 switching elements S21–28 of the stage S2 and 8 switching elements S31–38 of the stage S3. Each switching element has 16 inlets and 16 outlets and the network inputs IP1–1024 of MSN are connected to the inlets of the switching elements S11–18 of the first stage S1, whilst the outlets of the switching elements S31–38 of the last stage S3 are connected to the network outputs OP1–1024 of the switching network MSN. The 16 outlets of each switching element of the stages S1, S2 and S3 are arranged in routing groups as defined higher, where it is to be noted that the 8 routing groups including 2 outlets correspond exactly to the bundles OL1 to OL8 of 2 internal links. Routing groups including 4 or 8 outlets include a plurality of such distinct bundles. In the present example, each routing group OL1/8 is connected to a distinct part of MSN. Similarly, the 16 inlets of each switching element of the stages S2 and S3 are arranged in 8 groups of 2 inlets. It is to be noted that thanks to the above mentioned physical routing the 16 outlets of the switching elements of the last stage S3 can be individually addressed.

In the following part of the description examples of routing through the switching network MSN of FIG. 11 will be discussed. These examples are all concerned with the routing of cells to a group of network outputs SOP as can be advantageously achieved in accordance with the present invention. It is however to be noted that in a preferred embodiment other schemes of routing cells according to previously disclosed features can be used in parallel to those new features. Such routing schemes are described in detail in the first mentioned European patent application 0524350 which is also incorporated herein by reference.

In the embodiment described in this last mentioned patent application a group of network outputs SOPs addressed by performing a distribution over all outlets in a particular stage of the switching network MSN. It can be easily verified that, in this way, only groups of network outputs SOP can be addressed which group a number of network outputs equal to a power of 2 and whose constituent network outputs ports have indices, as indicated in FIG. 11, which are binary neighbours. Moreover the load will with such a system always have to be evenly distributed over all network outputs contained in the group of network outputs SOP.

In spite of these disadvantages, such a routing scheme will be used in parallel with the inventive new features in a preferred embodiment as already mentioned. In this way the memory capacity of the routing memory RM can be reduced so that one switching element can still be integrated on a single electronic chip.

Hereafter a first example of routing cells, through the switching network MSN of FIG. 11, made possible by the present invention will be described.

The group of network outputs SOP to be addressed in this example includes OP1–4, OP49–52, OP113–116 all of the first output plane PO1 and for instance each being connected to a 622 Mbit/s link in the case each network output has a bandwidth capacity of 155 Mbit/s. To fix ideas it will be supposed that the cell to be received is received on input port IP1. In fact, it can be verified that in a truly self routing switching network MSN it makes no difference on which input port the cell is actually received. The latter is due to the fact that in such a switching network MSN the self routing tag SRT solely determines which network outputs the cell is destined for as explained in detail in the above first mentioned European patent application 0524350.

Before being transmitted to S11 the switching node will verify to which connection the cell belongs and hence to which group of network outputs SOP the cell is to be routed. Then the corresponding self routing tag SRT will be filled in and the cell sent to S11.

In S11 the self routing tag SRT is analyzed which in the present case will lead to the selection of one routing group via an output address contained in the routing control address RCA. In this way the routing group with size 2 and connected to OL1 will be addressed and the cell sent over the interconnection to S21.

In order to reach the mentioned group of network outputs, in S21 the cell will have to be distributed over 3 possible routing groups, i.e. those connected to switching elements S31, S34 and S38. Such a controlled distribution is possible with the inventive new features by defining a set including these 3 routing groups. This set can be accessed by reading it out of a memory location MSK with an address corresponding to a route reference number included in the self routing tag SRT of the cell and more particularly in the routing control address RCA. This route reference number can for instance be identical to an identification number of this particular group of network outputs within the present switching node. In so doing the cell will eventually be transmitted to the mentioned switching elements (only 2 out of the 3 switching elements are shown in FIG. 11).

In the last stage the same memory address corresponding to the route reference number could contain sets of 2 routing groups of size 2 and corresponding to the above defined network outputs but this space in the routing memory RM can also be saved by including an output address in the SRT for this last stage S3 and which identifies a routing group of size 4 encompassing the two aforementioned routing groups.

It is to be noted that in assigning to each different group of network outputs SOP a different route reference number, the number of possible SOP's is restrained by the memory capacity of the routing memory RM. The latter can however be partly remedied exploiting the partitioned nature of the switching network MSN of FIG. 11. Indeed, referring again to the previous example the group of network outputs SOP resided entirely in the first output plane PO1. In routing the cell via an output address, included in RCA, to this first output plane PO1, all other output planes PO2; PO8 will never receive a cell destined to this example's group of network outputs SOP and a same route reference number may be used for any other SOP which does not include a network output from the first output plane PO1. It can be clearly seen that in the above way a hybrid form of routing through the switching network is used which advantageously diminishes the required memory capacity needed in each switching element.

An important advantage of a switching node according to the present invention is that it can simply and efficiently react to failures of transmission links as will be now described in detail. Referring again to the previous example, the reaction of the switching network MSN to failure of the network output OP1 will be described. Without any reaction it would have to be assured at switching node level that switching element S31 only receives as much cells as can be handled by OP2–4 and, since S21 remains evenly distributing the cells received by it, the total bandwidth of the group of network outputs SOP would have to be decreased from 12 to 9 strongly underloading output ports OP49–52 and OP113–116. Using the inventive features of the present invention however, it is possible to redefine the selection frequency values in the switching element S21 to 3 for S31 and to 4 for S34 and S38 so that the cells will be distributed accordingly by S21. It can be easily verified that in so doing to total bandwidth of this SOP only has to be decreased from 12 to 11 so preserving the maximal load on all operating network outputs.

It is to be noted that the above principle of load balancing can be also used to address groups of network outputs which bandwidth capacity is not evenly distributed over the various paths leading to the constituent network outputs such as e.g. the group OP1, OP125–128 and OP1008–1015. This group of network outputs would indeed require, as can be easily verified, a set defined in the first stage S1 and including routing groups corresponding to OL1 and OL8 with selection frequency values 5 and 8 respectively and a set defined in the second stage S2 of the first output plane again including routing groups corresponding to OL1 and OL8 with selection frequency values 1 and 4 respectively.

With respect to the above latter embodiment of a switching node and a routing logic means according to the present invention, it has to be noted that these embodiments practically constrain the new routing type to point-to-point connections only. However, such a restriction is clearly only an attribute of these latter embodiments and by no means of the invention as such as can be clearly appreciated from the switching node and routing logic means embodiment discussed with reference to FIG. 8.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. An asynchronous switching node for distributing cells from an input port (I1, . . . , IN) of the node (ND) to a group of output ports (LG1, . . . , Lgk) thereof and including a plurality of switching stages (S1, S2, S3) each including at least one switching element (S11, . . . , S3N) having a plurality of inlets (IP1–IPN) and outlets (OP1–OPN) and each switching element (S11, . . . , S3N) including a routing logic means (MC1; MC2; RL) for routing one of said cells from one of the inlets (IP1–IPN) of said at least one switching element (S11, S3N) to at least one of the outlets (OP1–OPN) thereof based on an internal routing label associated with said one of said cells, wherein said at least one switching element (S11, . . . , S3N) uses said internal routing label to identify at least one distribution tree having branches (BR1, . . . , BR6) which connect said input port (I1, . . . , IN) with said group of output ports (LG1, . . . , Lgk), and wherein said routing logic means (MC1; MC2; RL) includes a preselection means (MB; M; RM) for preselecting under the control of said internal routing label a set of said branches (BR1, . . . , BR6), includes selection means (MX; MX'; SEL) for dynamically selecting one of the set of said branches (BR1, . . . , BR6) and includes means for identifying a route on a selected outgoing branch (BR1, . . . , BR6) from said at least one switching element (S11, . . . , S3N).

2. Asynchronous switching node according to claim 1, wherein said node (ND) also includes an input stage (T1, . . . , TN) which associates at input ports (I1, . . . , IN) thereof said internal routing label to said cell by determining from external routing data (VPI-VCI) included in said cell to which of said groups of output ports (LG1, . . . , LGk) said cell is destined for.

3. Asynchronouos switching node according to claim 1, wherein said selection means (MX; MX'; SEL) selects one of said preselected branches under control of a selection frequency value which is so determined that a probability of selecting each of said preselected branches is proportional to a bandwidth of those of said output ports of said group (LG1, . . . , LGk) accessible via the thus selected branch.

4. Asynchronous switching node according to claim 1, wherein said selection means selects one of said preselected branches via a time dependent algorithm.

5. Asynchronous switching node according to claim 1, wherein said selection means selects one of said preselected branches via an algorithm that is dependent on a position of said switching element in a stage (S1, S2, S3) of which it forms part.

6. Asynchronous switching node according to claim 1, wherein said internal routing label of selected cells of said cells from an input port is such that at least one of said routing logic means (RL) performs a full distribution over the outlets of the switching element (S11, ..., S3N) of which it forms part so as to address a said group of output ports (LG1, ..., LGk).

7. Asynchronous switching node according to claim 1, wherein said internal routing label of said cell identifies a multicast tree comprising a plurality of distribution trees, said preselection means selecting according to said internal routing label a plurality of sets of branches, each of said sets including all of said branches connected to said switching element and belonging to distinct ones of said plurality of distribution trees, said selection means selecting a branch per said set of preselected branches and said routing logic means further also including multicast means for transferring a copy of said cell on a route on each thus selected branch outgoing from said switching element.

8. Routing logic means for a switching element (S11, ..., S3N) having at least one inlet and a plurality of outgoing routes each comprising at least one outlet, said routing logic means (MC1; MC2; RL) selecting for cells received at said at least one inlet at least one or said plurality of outgoing routes as a selected route based on an internal routing label associated with said cells and routing said cells to said at least one outlet of said selected route, wherein said routing logic means (MC1; MC2; RL) includes preselection means (MB; M; RM) which preselect under control of said internal routing label, at least one preselected set having at least one of said plurality of outgoing routes and includes selection means (MX; MX'; SEL) to select said selected route from said at least one preselected set.

9. Routing logic means (RL) according to claim 8, wherein said preselection means is a routing memory (RM) the memory locations (MSK) of which are addressed by a route reference number included in said internal routing label, each of said memory locations identifying routes of a distinct set.

10. Routing logic means (RL) according to claim 8, wherein said routing logic means (RL) is also adapted to select a plurality of routes, said selection means (SEL) thereto being controlled by a routing indicator (RI), derived from said internal routing label (TPC), for selecting either one or all of said routes included in said set.

11. Routing logic means (RL) according to claim 9, wherein in each of said memory locations (MSK) a distinct selection frequency value is associated with each route included in one of said distinct sets and wherein a relative frequency with which one of said routes is selected from said one distinct set by said selection means (SEL) is proportional to a selection frequency value associated with said one route.

12. Routing logic means (RL) according to claim 11, wherein said routing logic means (RL) updates said selection frequency values when an error disabling use of an outlet of said switching element is detected.

13. Routing logic means (RL) according to claim 8, wherein said routes have different sizes, each of said outlets belonging to a plurality of routes each of which has a different size and wherein a route size indicator (RGS) is used to indicate to said selection means (SEL) that only the routes of a specific size are to be considered.

14. Routing logic means (RL) according to claim 8, wherein said routing logic means (RL) further comprises combinatorial routing logic (CRL) for identifying based on an output address included in said internal routing label one of said plurality of outgoing routes, the selection of an output address being based on transfer pattern code data (TPC).

* * * * *

UNITED STATES PATENT AND TRADEMARK OFFICE
CERTIFICATE OF CORRECTION

PATENT NO. : 5,506,840
DATED : April 9, 1996
INVENTOR(S) : Pauwels et al.

It is certified that error appears in the above-indentified patent and that said Letters Patent is hereby corrected as shown below:

At column 24, line 35, please add "...," to read --..., S3N)--.

At column 25, line 29, please change "or" to --of--.

Signed and Sealed this

Twenty-third Day of July, 1996

Attest:

BRUCE LEHMAN

Attesting Officer

Commissioner of Patents and Trademarks